United States Patent [19]
Malec et al.

[11] Patent Number: 5,287,266
[45] Date of Patent: Feb. 15, 1994

[54] INTELLIGENT SHOPPING CART SYSTEM HAVING CART POSITION DETERMINING CAPABILITY

[75] Inventors: John Malec, Chicago; Joseph P. Moser, Glendale Heights, both of Ill.

[73] Assignee: VideOcart, Inc., Chicago, Ill.

[21] Appl. No.: 45,826

[22] Filed: Apr. 12, 1993

Related U.S. Application Data

[63] Continuation of Ser. No. 435,500, Jul. 13, 1989, which is a continuation-in-part of Ser. No. 99,288, Sep. 21, 1987, Pat. No. 4,973,952.

[51] Int. Cl.⁵ .......................................... G06F 15/21
[52] U.S. Cl. ............................... 364/401; 340/825.49
[58] Field of Search ................. 364/401, 400, 710.04; 340/825.49, 825.32

[56] References Cited

U.S. PATENT DOCUMENTS

| | | | |
|---|---|---|---|
| 4,002,886 | 1/1977 | Sundelin | 214/16.4 A |
| 4,071,740 | 1/1978 | Gogulski | 235/431 |
| 4,500,880 | 2/1985 | Gomersall et al. | 340/825.35 |
| 4,750,151 | 6/1988 | Baus | 364/400 |
| 4,773,175 | 9/1988 | Larsen | 40/308 |
| 4,968,047 | 11/1990 | Ferris | 280/33.992 |
| 4,988,025 | 1/1991 | Lipton et al. | 364/710.04 |
| 5,072,956 | 12/1991 | Tannehill et al. | 40/482 |
| 5,158,310 | 10/1992 | Tannehill et al. | 40/482 |

FOREIGN PATENT DOCUMENTS

| | | | |
|---|---|---|---|
| 0170194 | 2/1986 | European Pat. Off. | G06F 15/24 |
| 2596902 | 10/1987 | France | G08C 19/00 |

*Primary Examiner*—Gail O. Hayes
*Attorney, Agent, or Firm*—Fitch, Even, Tabin & Flannery

[57] ABSTRACT

A shopping cart display system is provided to present product advertisements to consumers who do not have this information. This shopping cart display system includes a cart mounted display that is responsive to unique trigger signals provided by respective transmitters associated with respective fixed locations. When the display receives a unique trigger signal, it displays advertising associated with the respective location. In one embodiment, the display includes a sensor determining whether the information is displayed in the presence of a customer, and a memory for storing all signals received during a given shopping trip and the times that those trigger signals were received. The stored trigger signals may then be used to analyze the path of the shopping cart. The stored data are transmitted to a polling transceiver located at a point of sale register for later analysis. Provision is made for the customer to request and receive information, such as deli numbers.

6 Claims, 29 Drawing Sheets

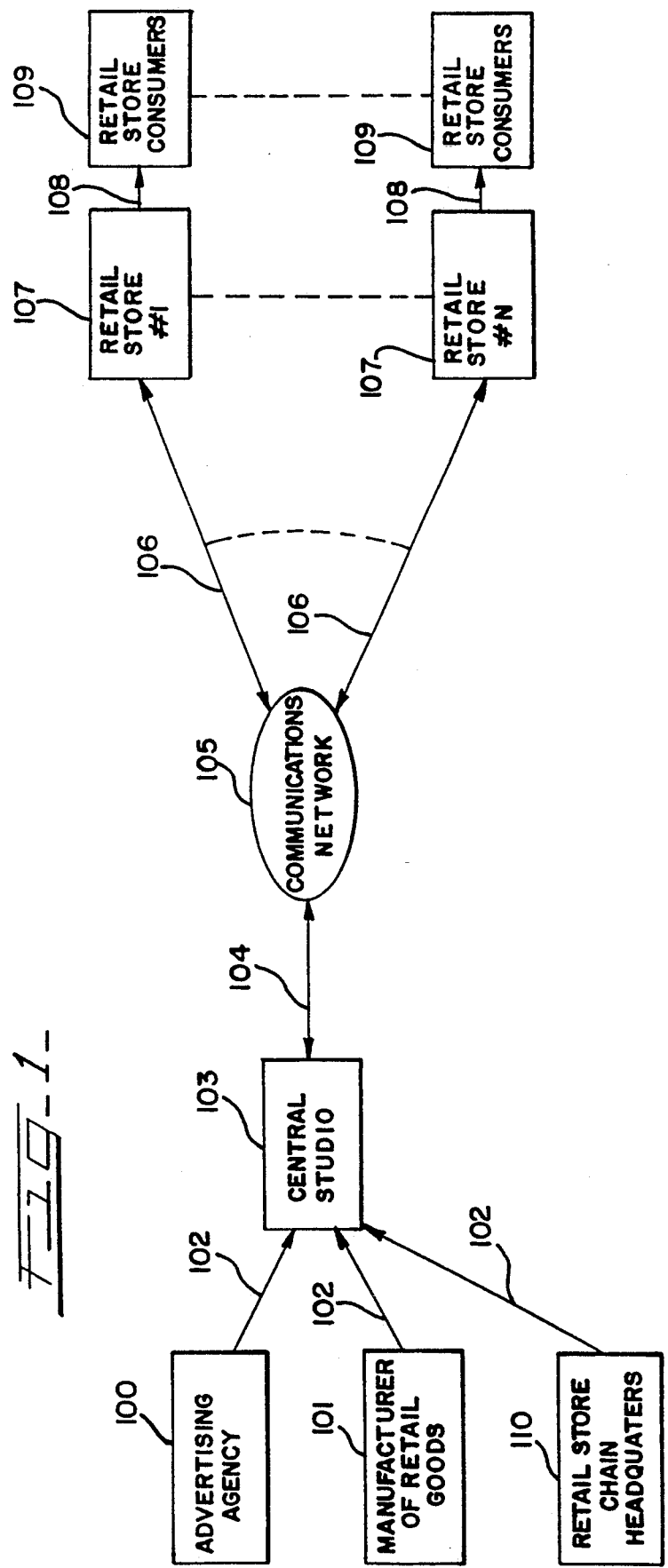

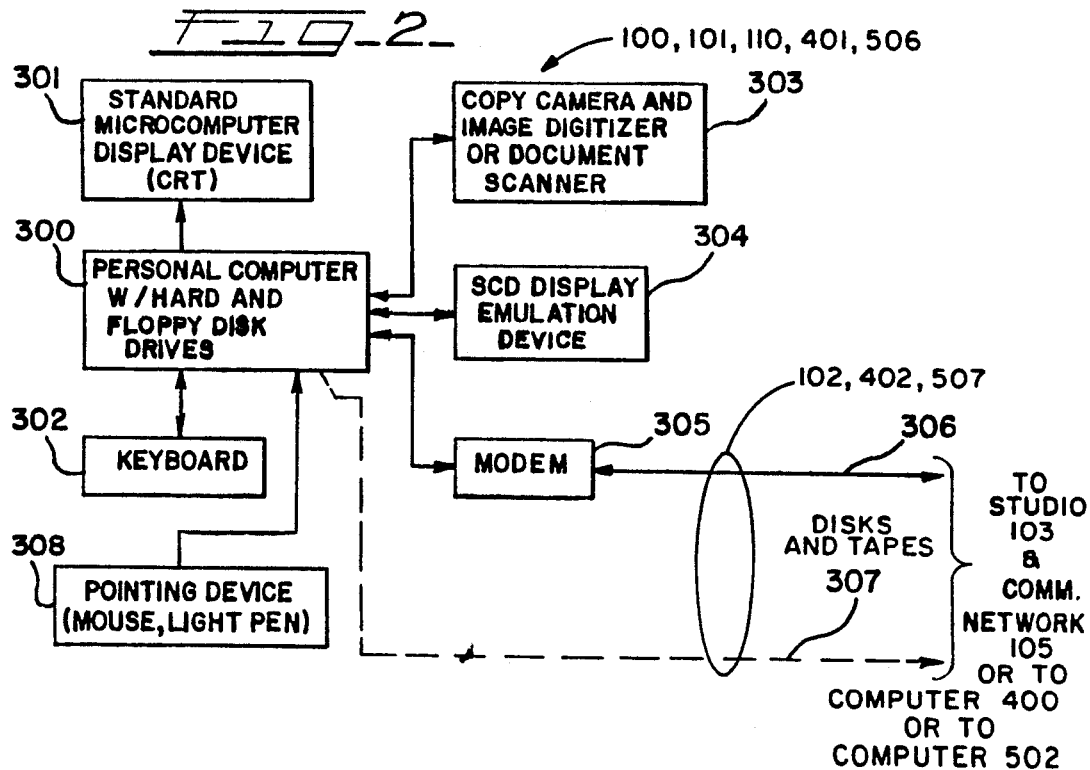
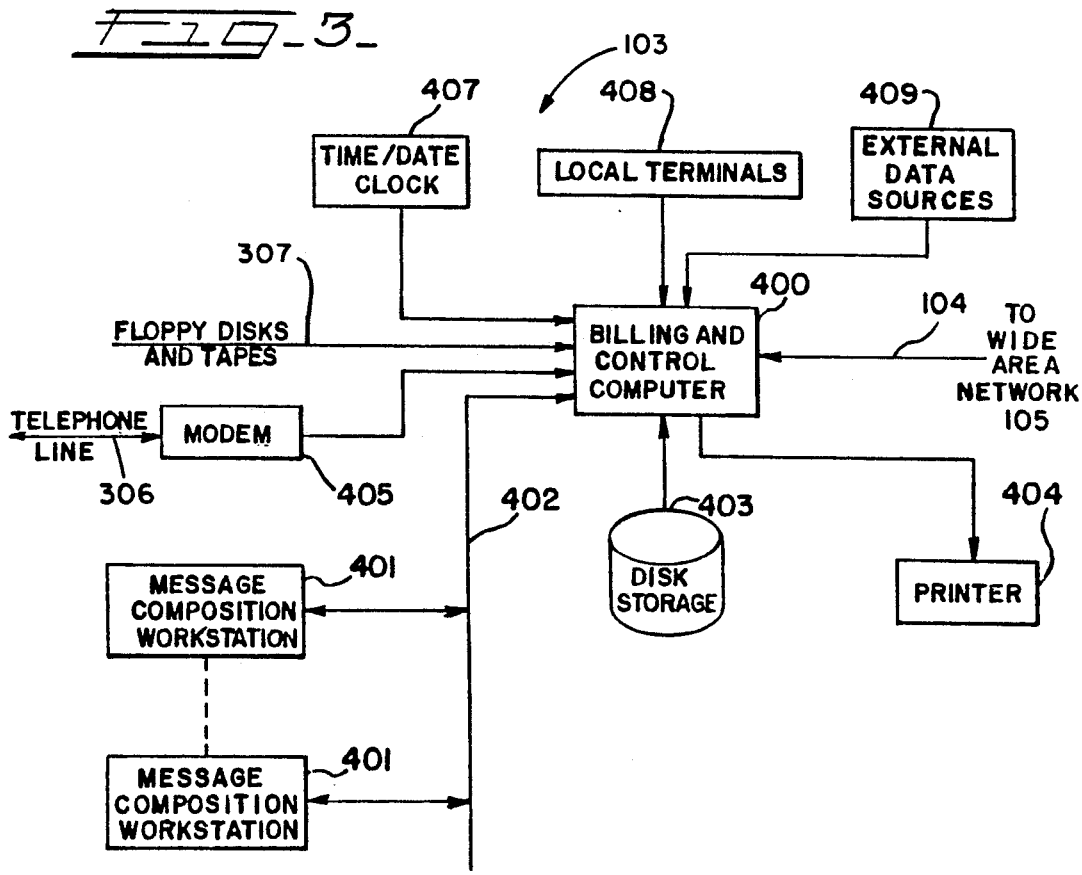

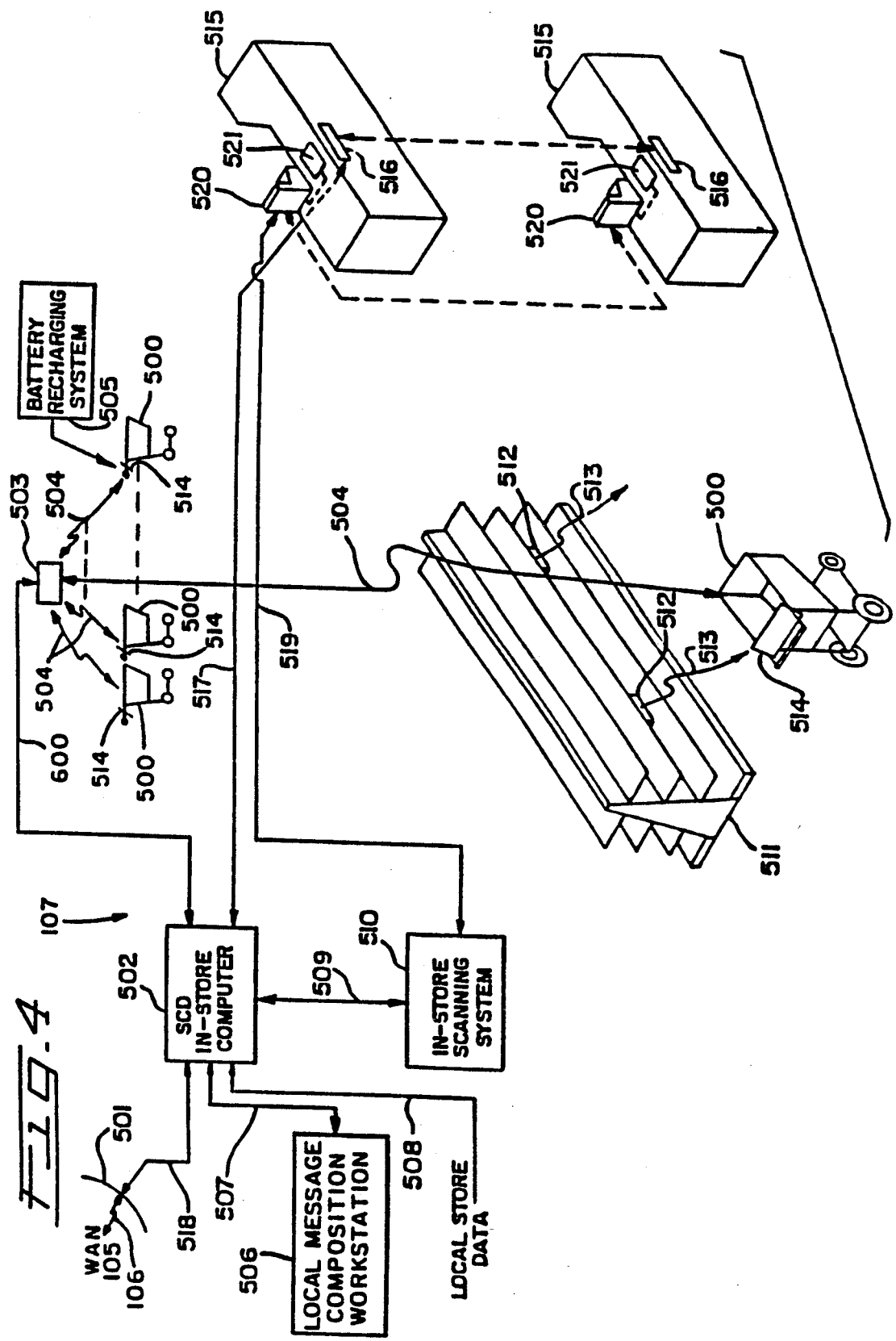

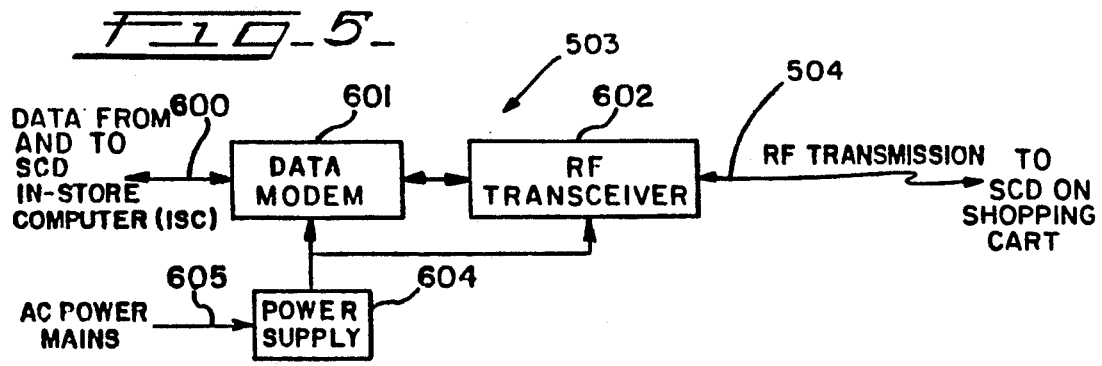
FIG-5
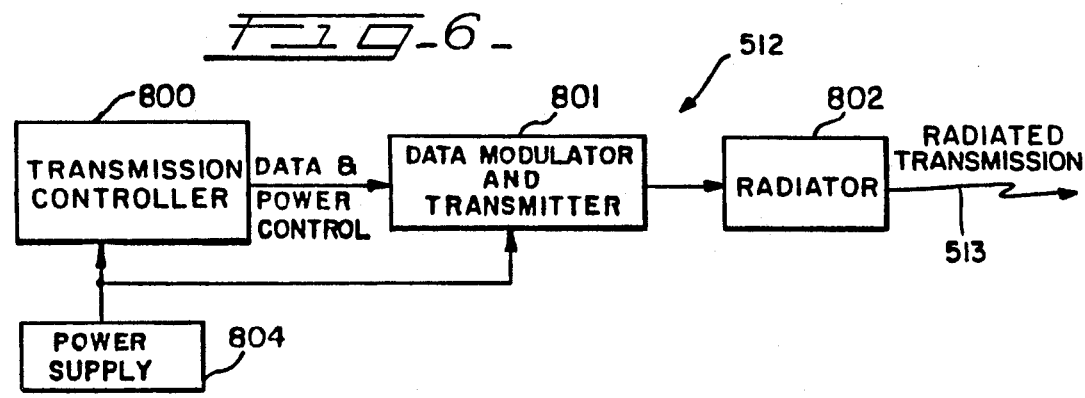
FIG-6
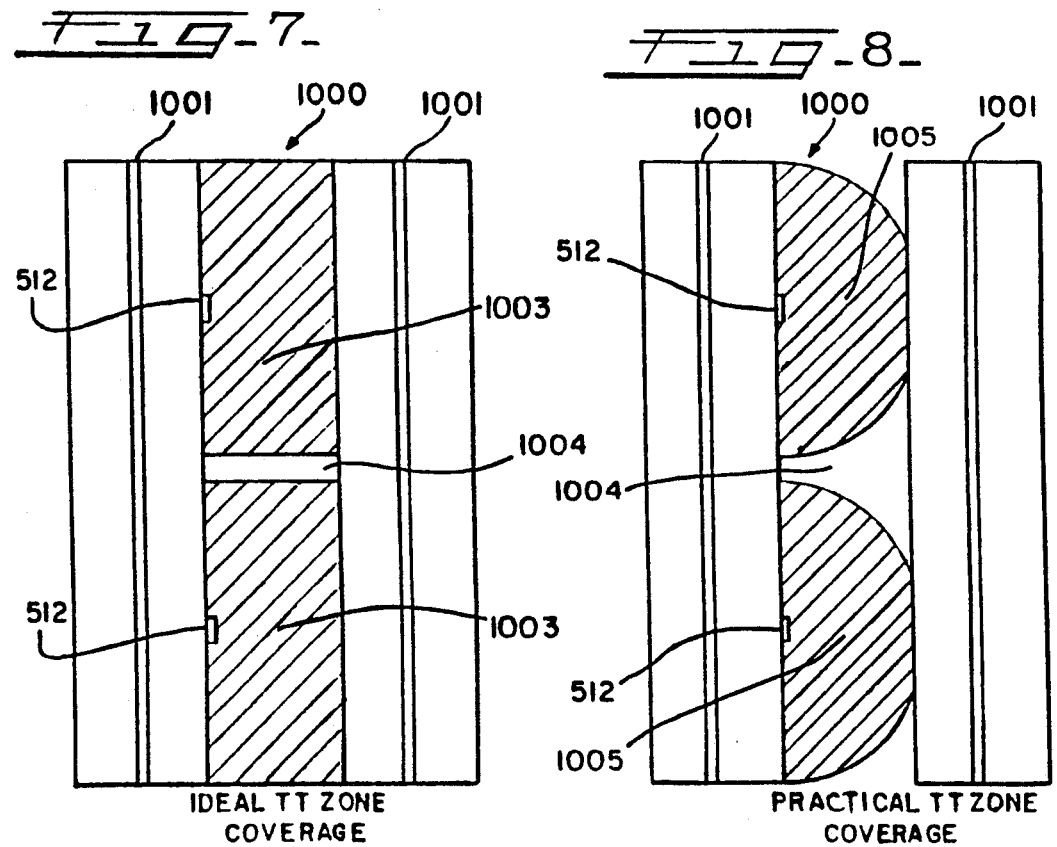
FIG-7 — IDEAL TT ZONE COVERAGE
FIG-8 — PRACTICAL TT ZONE COVERAGE

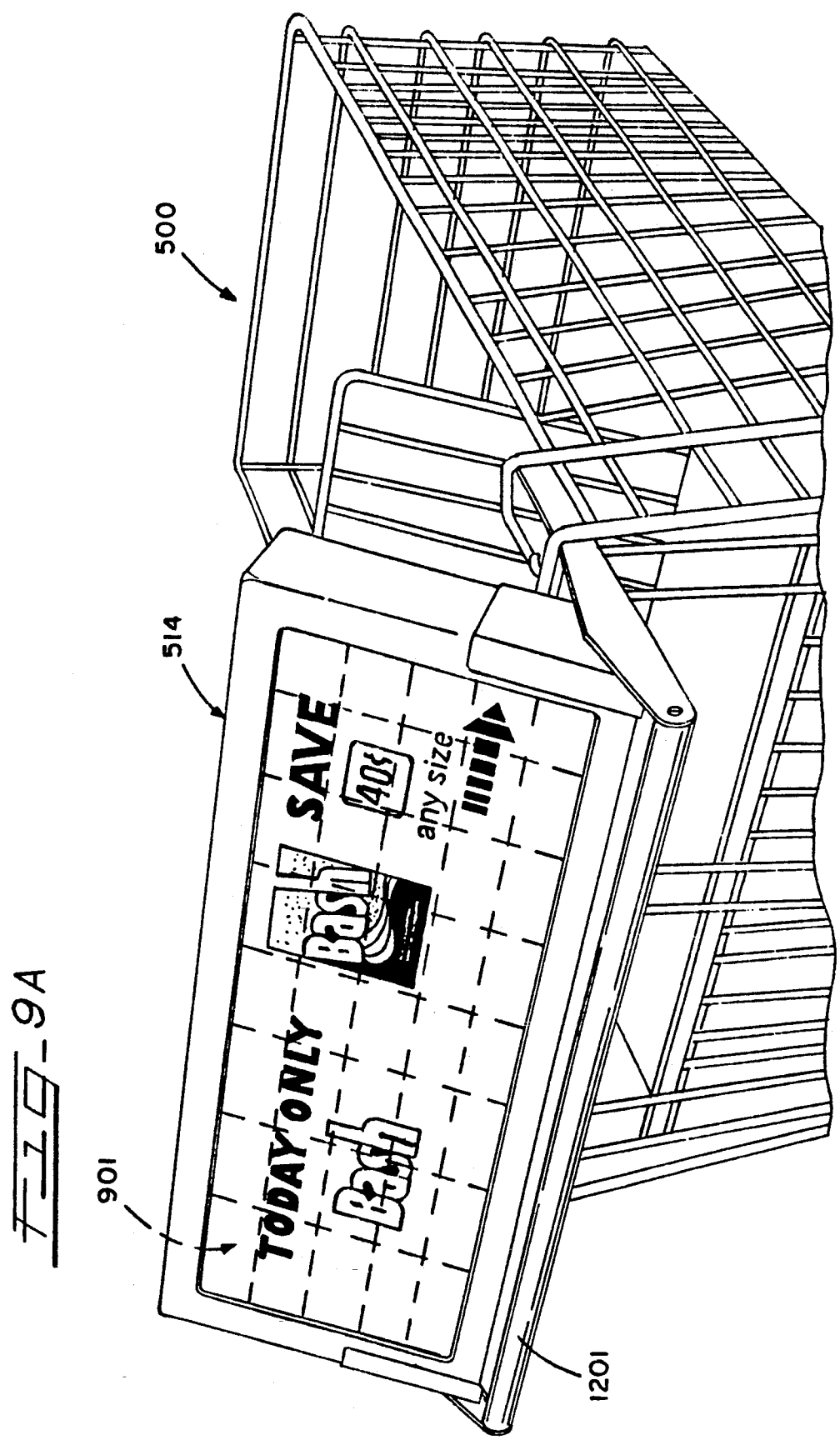

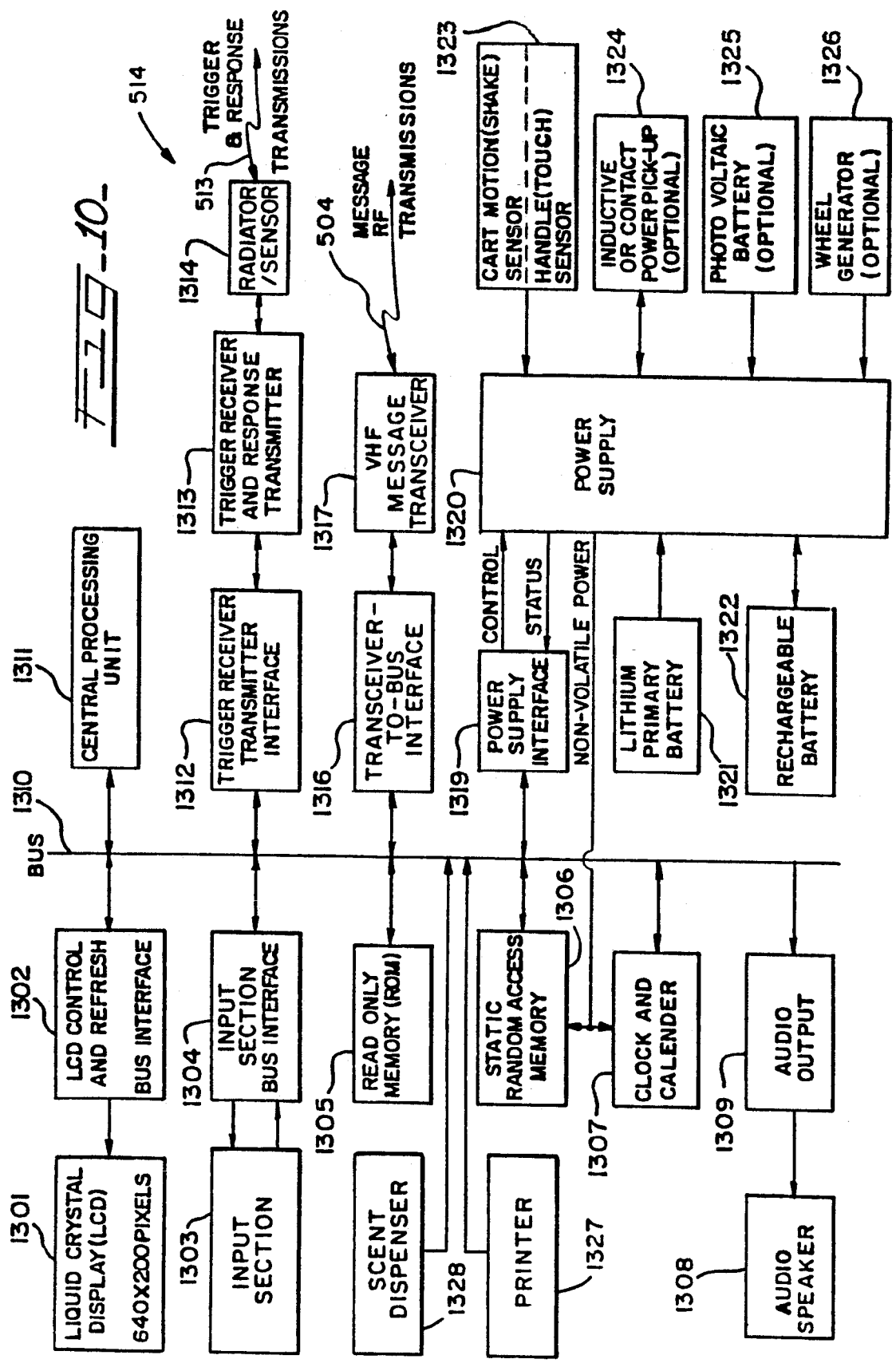

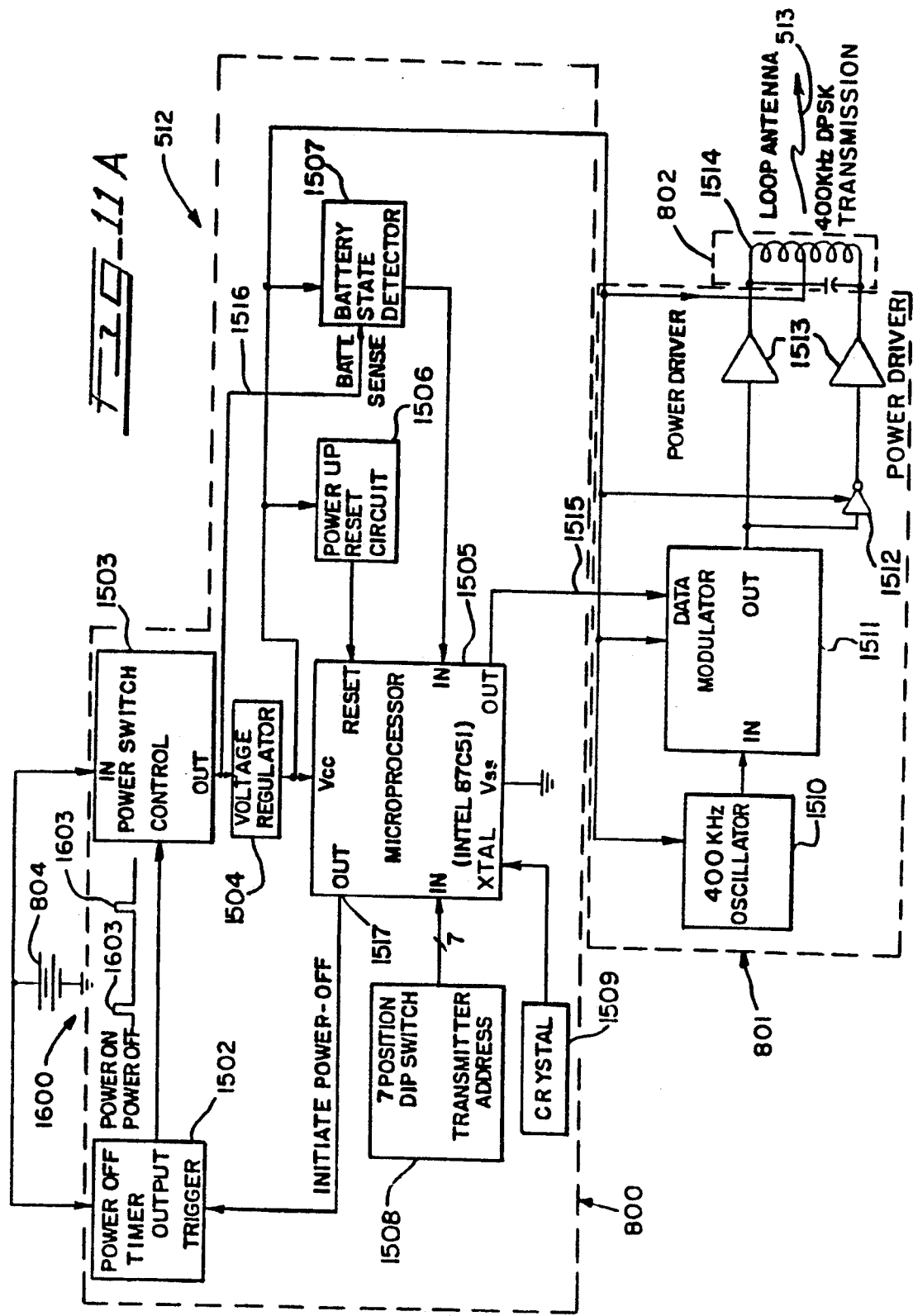

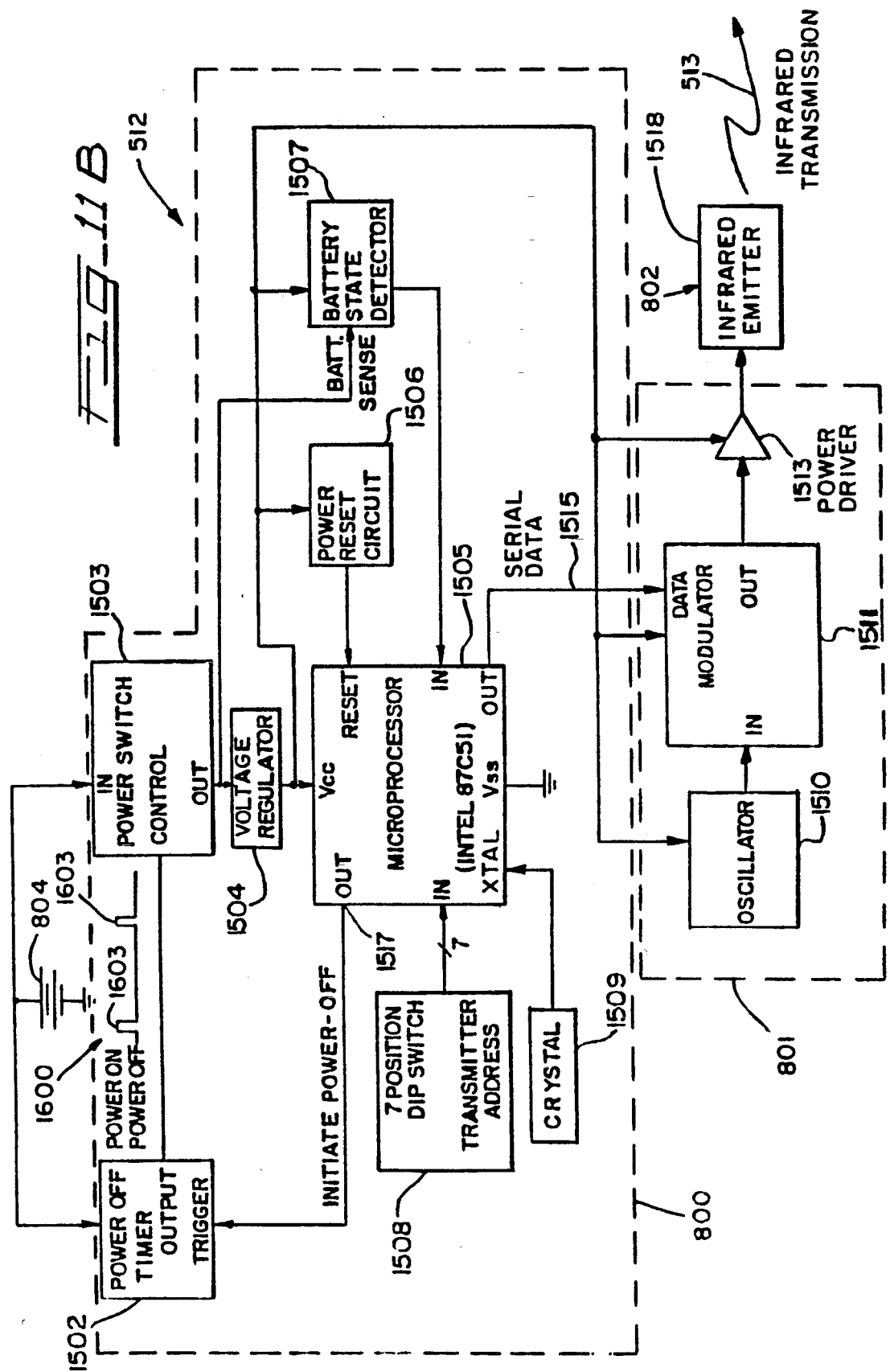

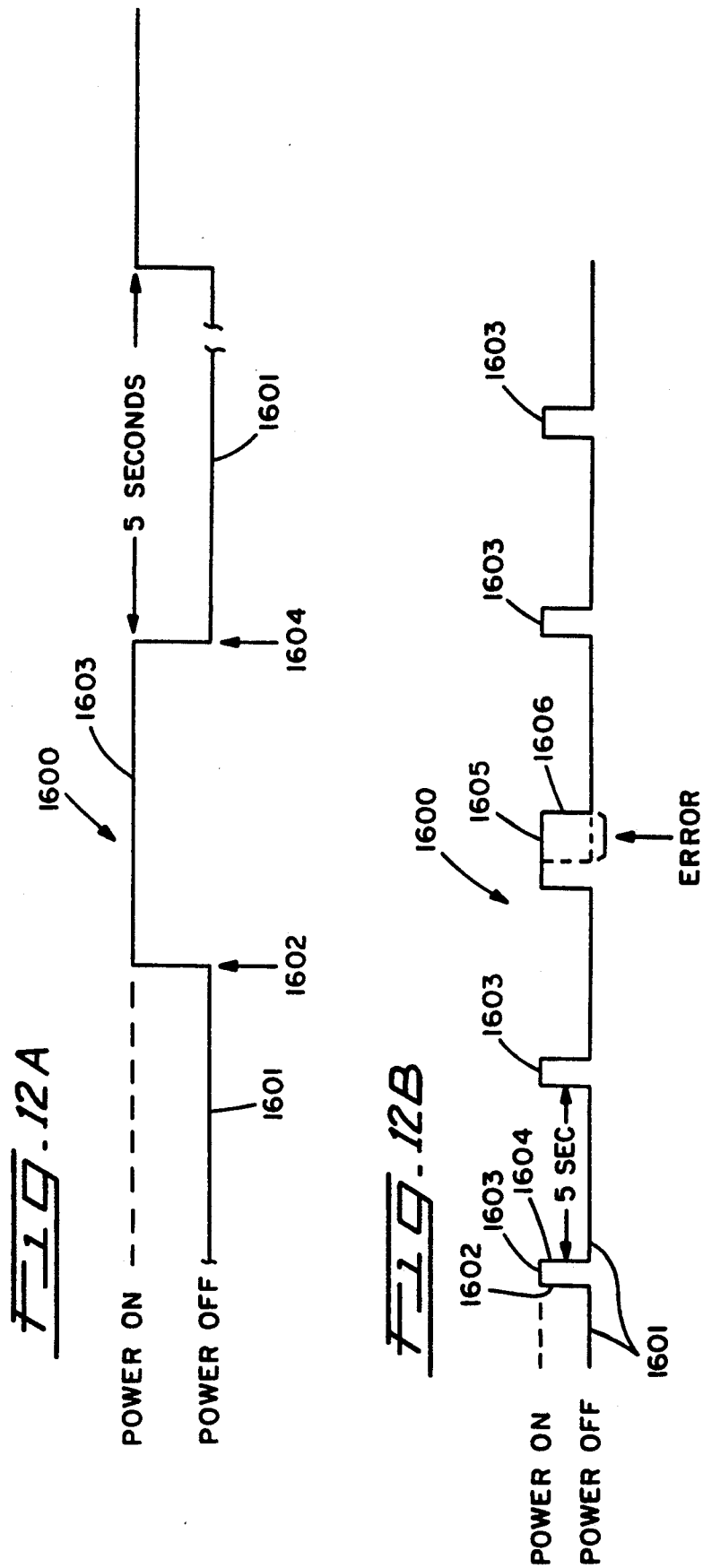

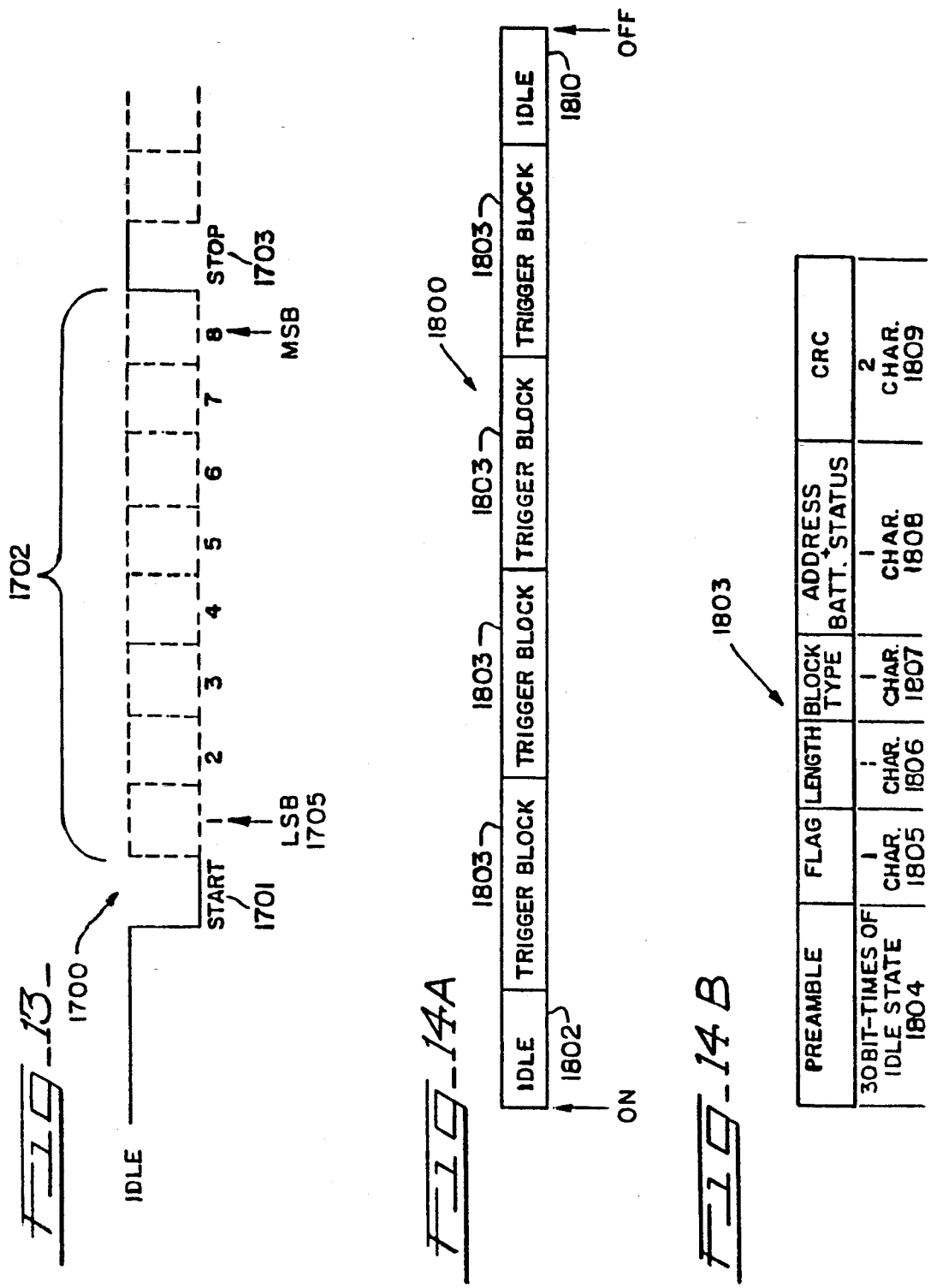

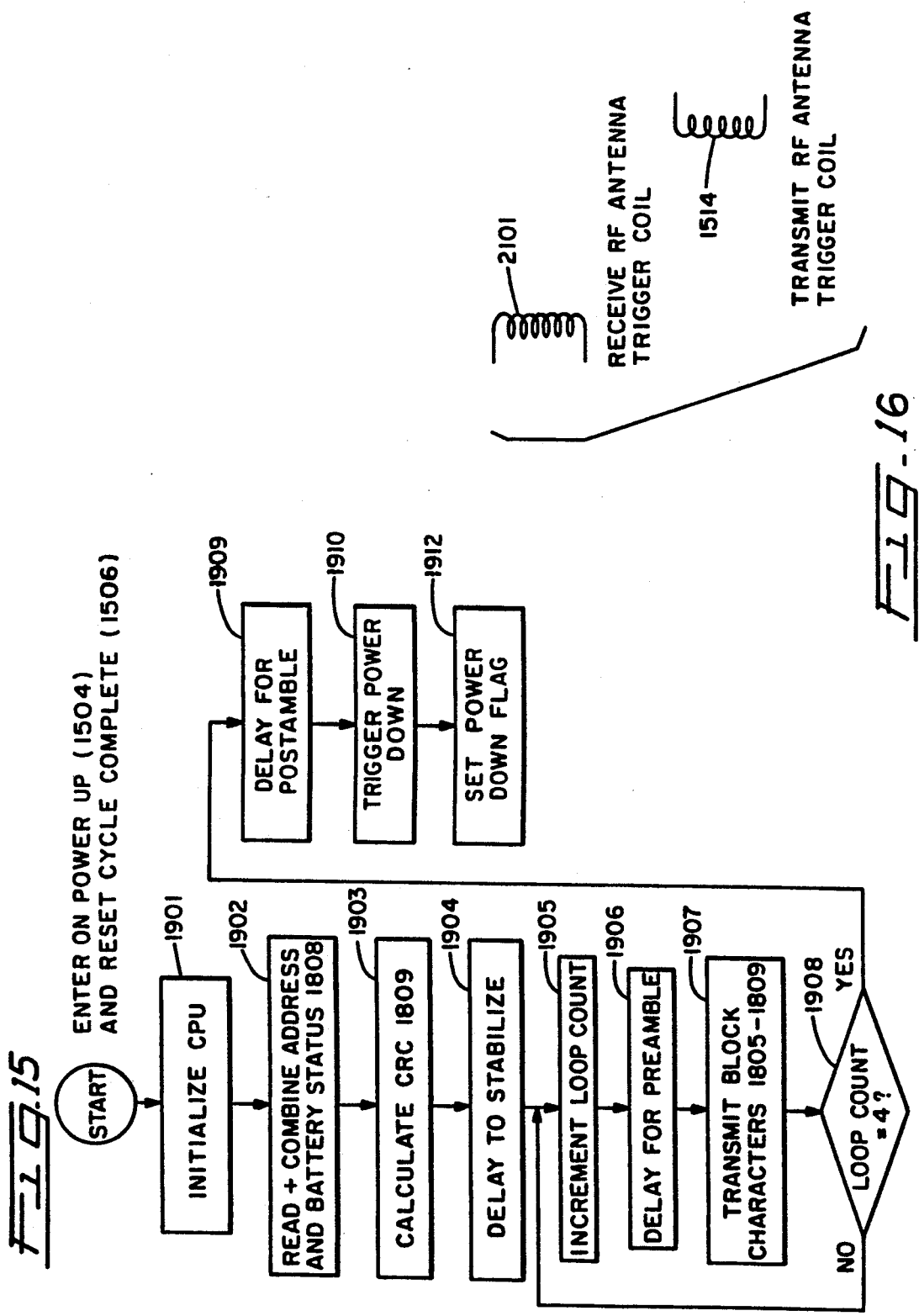

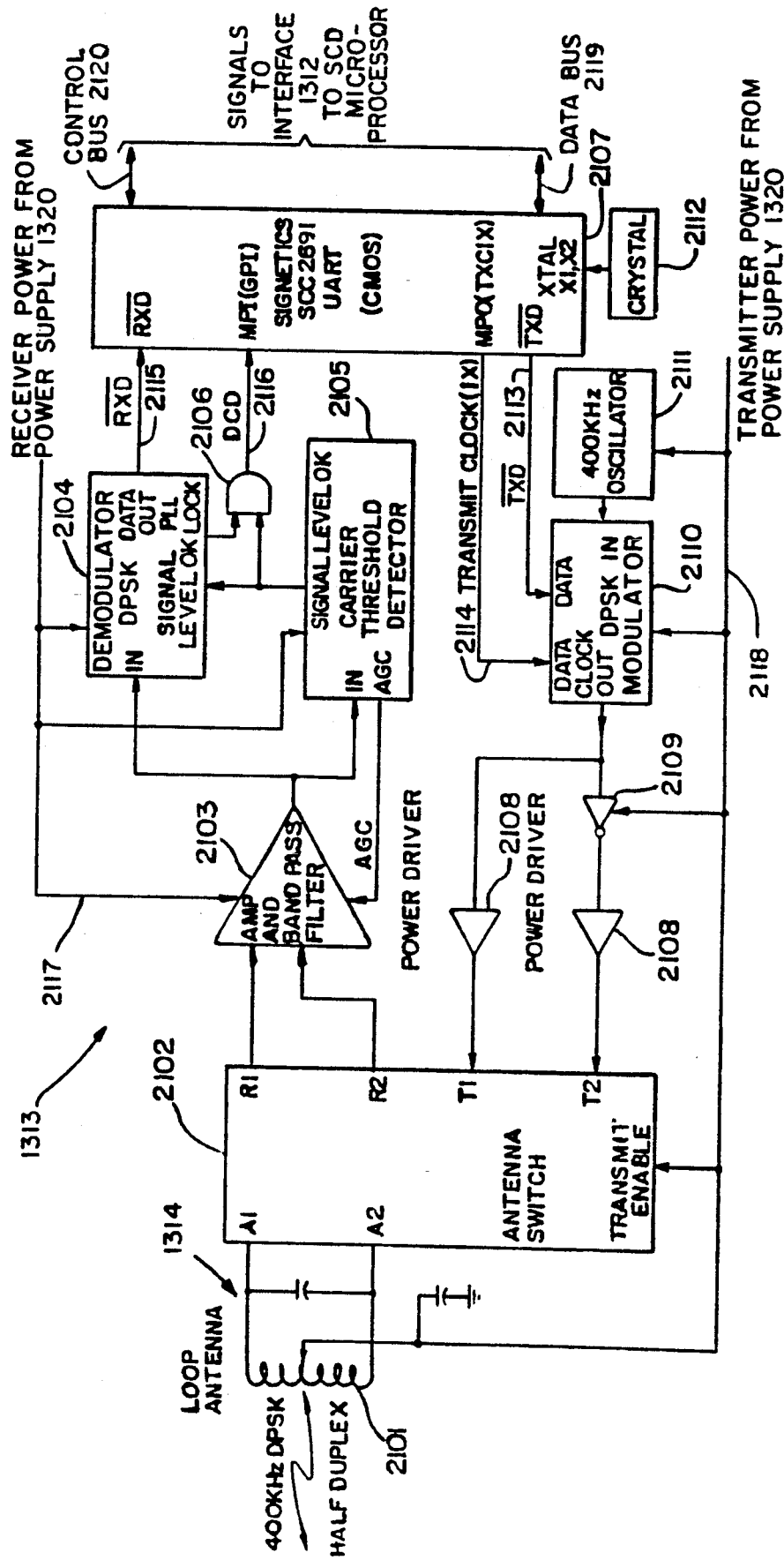

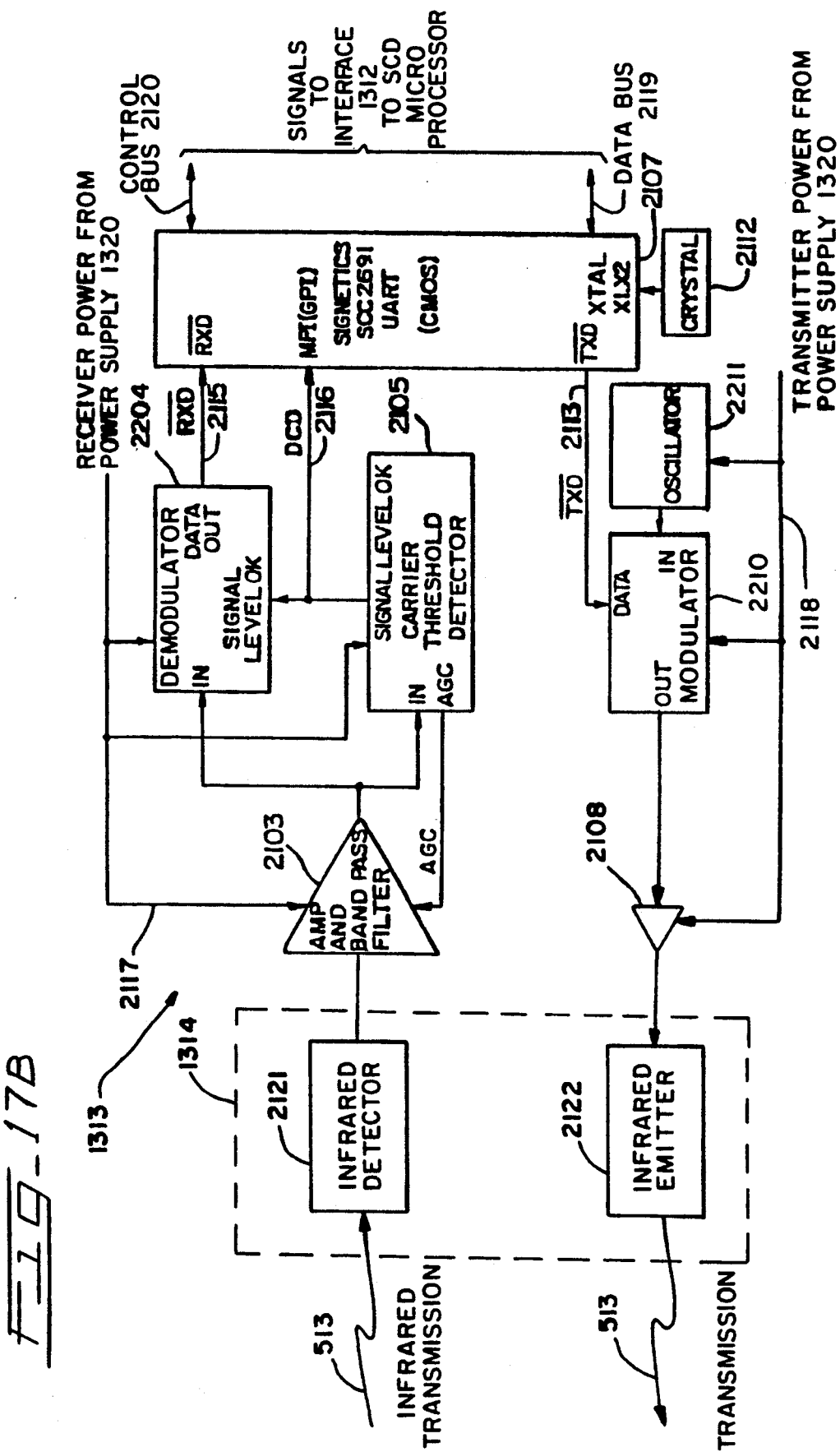

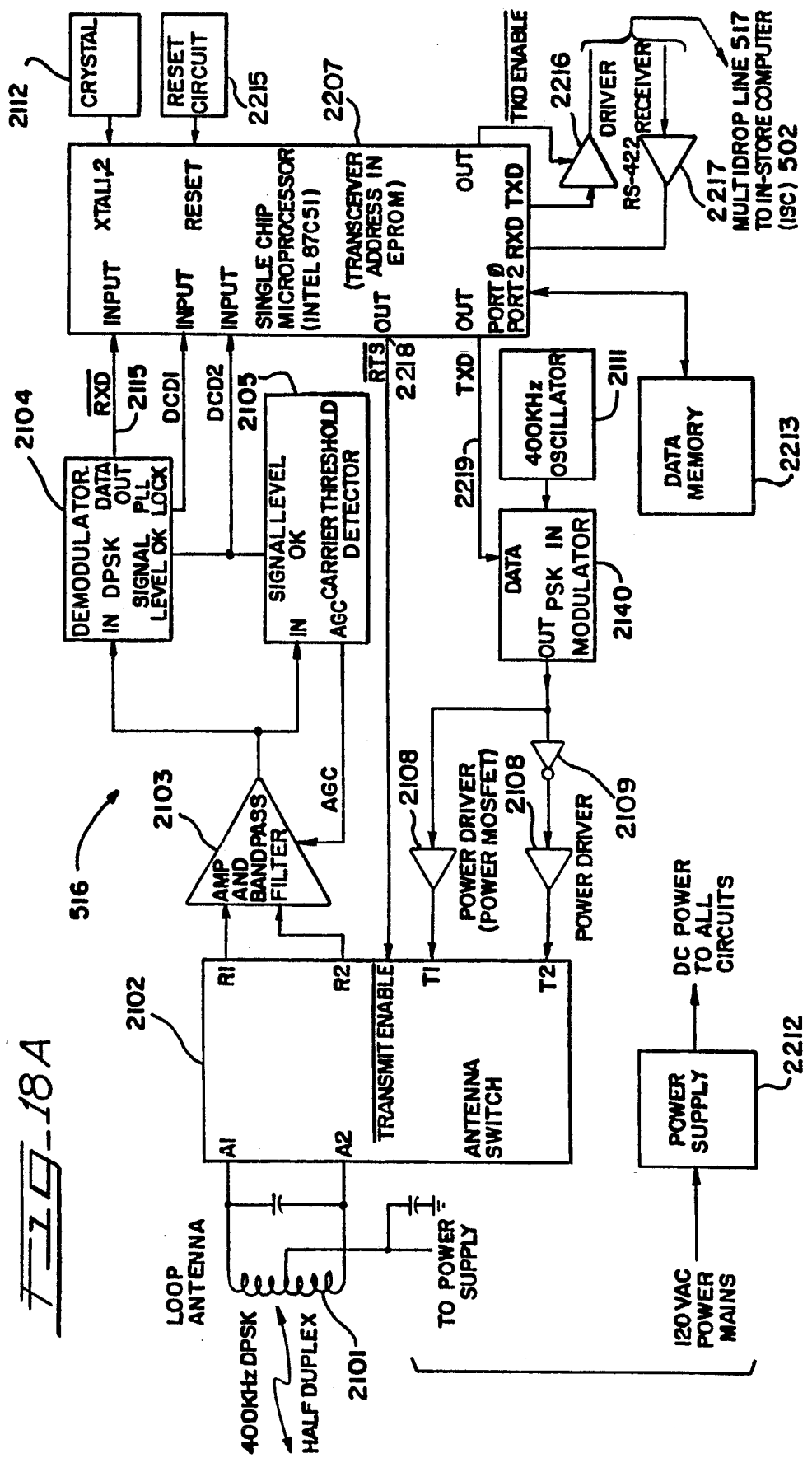

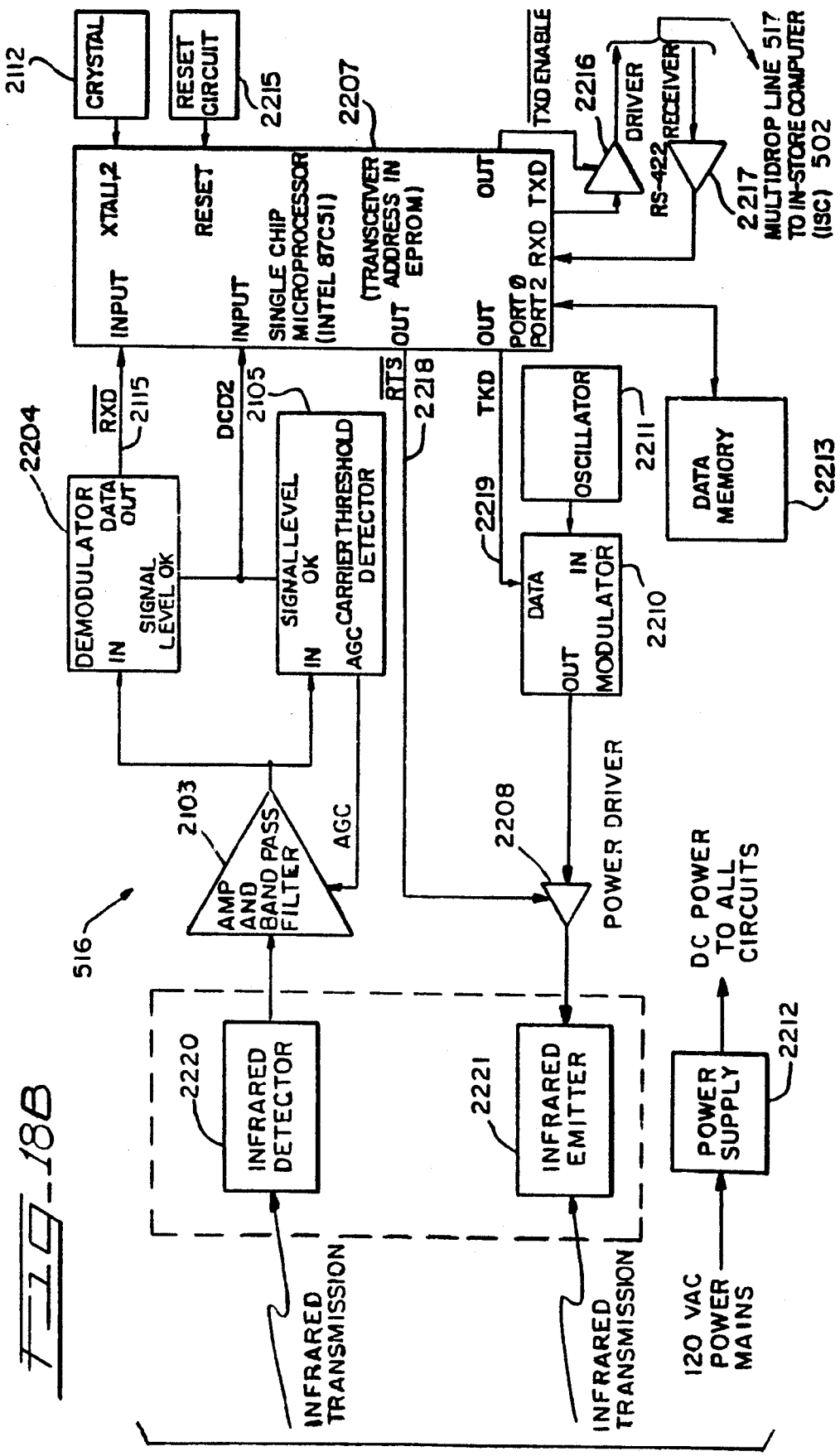

Fig. 19

| PREAMBLE | FLAG | LENGTH | BLOCK TYPE | TRANSCEIVER ADDRESS | CRC | POSTAMBLE |
|---|---|---|---|---|---|---|
| 30 BIT-TIMES OF IDLE STATE 2301 | | 1 CHAR. 2302 | 1 CHAR. 2303 | 1 CHAR. 2304 | 1 CHAR. 2305 | 2 CHAR. 2306 | 30 BIT-TIMES OF IDLE STATE 2307 |

Fig. 20 2403

| PREAMBLE | FLAG | LENGTH | BLOCK TYPE | REQUESTOR ADDRESS | CART ADDRESS & BATT. STATUS | CRC | POSTAMBLE |
|---|---|---|---|---|---|---|---|
| 30 BIT-TIMES OF IDLE STATE | | 2 CHAR. | 1 CHAR. | 1 CHAR. | 2 CHAR. | 2 CHAR. | 30 BIT-TIMES OF IDLE STATE |

Fig. 21 2503

| PREAMBLE | FLAG | LENGTH | BLOCK TYPE | REQUESTOR ADDRESS | CART ADDRESS & BATT. STATUS | DUMP OF CART DATA LOG | CRC | POSTAMBLE |
|---|---|---|---|---|---|---|---|---|
| 30 BIT-TIMES OF IDLE STATE | | 1 CHAR. | 1 CHAR. | 1 CHAR. | 2 CHAR. | VAR. NO. OF CHAR. | 2 CHAR. | 30 BIT-TIMES OF IDLE STATE |

Fig. 22 2603

| PREAMBLE | FLAG | LENGTH | BLOCK TYPE | REQUESTOR ADDRESS | CART ADDRESS & BATT. STATUS | CRC | POSTAMBLE |
|---|---|---|---|---|---|---|---|
| 30 BIT-TIMES OF IDLE STATE | | 2 CHAR. | 1 CHAR. | 1 CHAR. | 2 CHAR. | 2 CHAR. | 30 BIT-TIMES OF IDLE STATE |

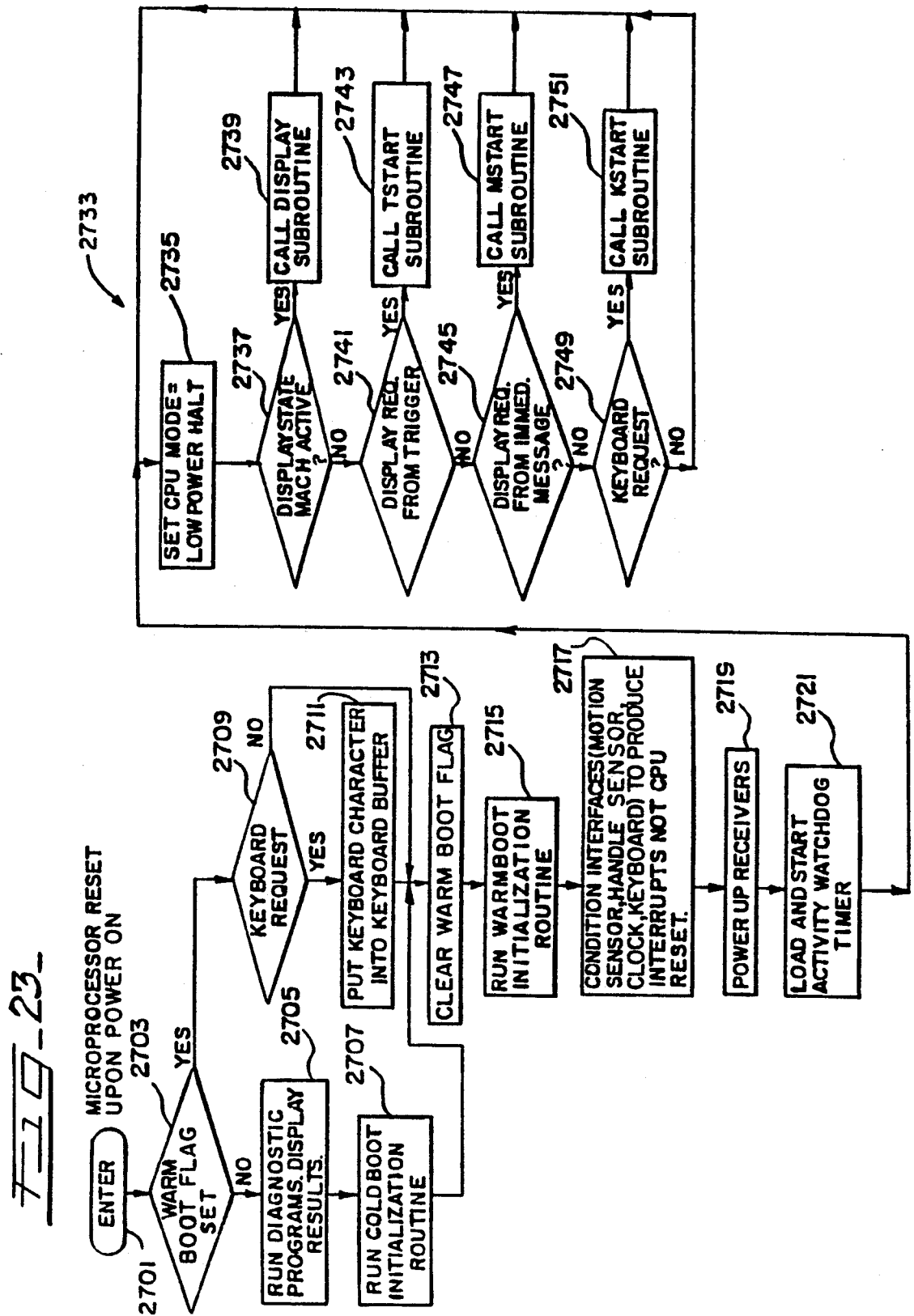

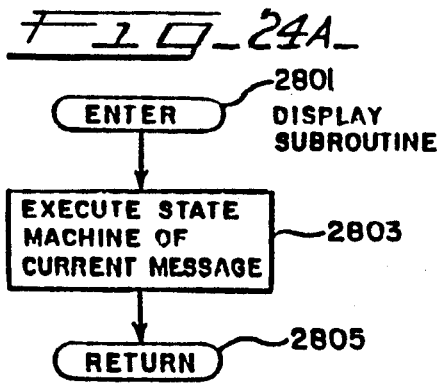
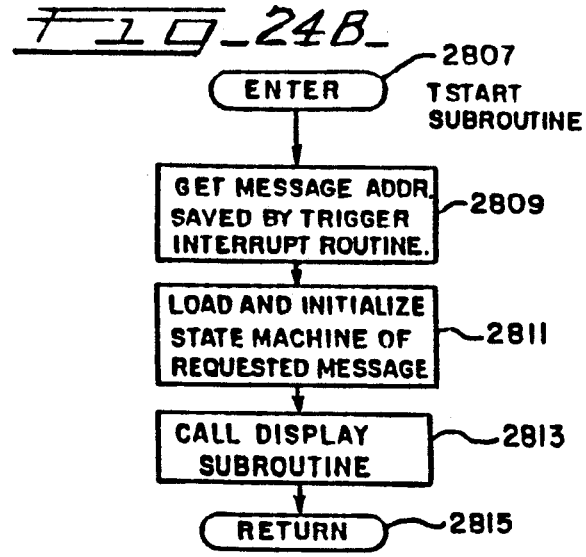
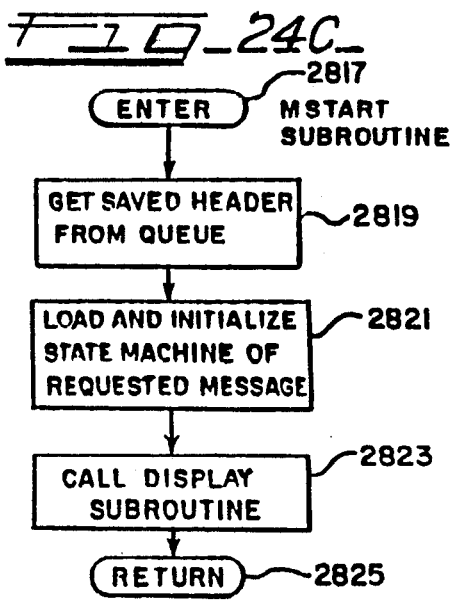
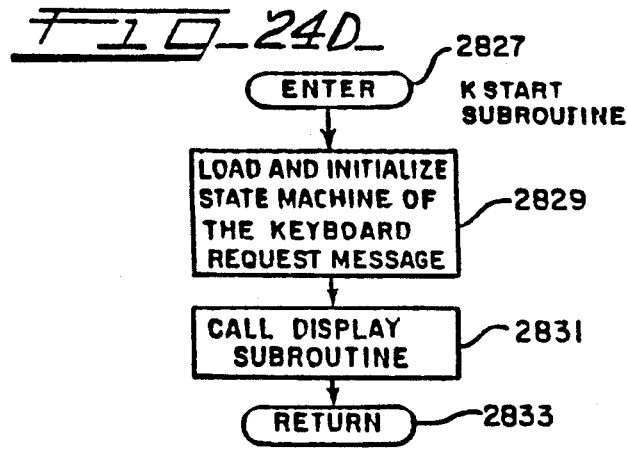
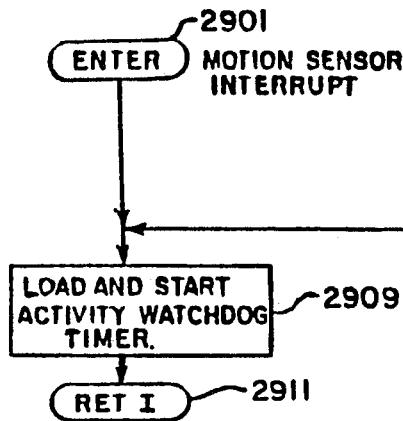
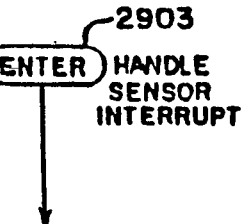
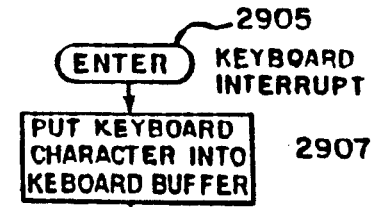
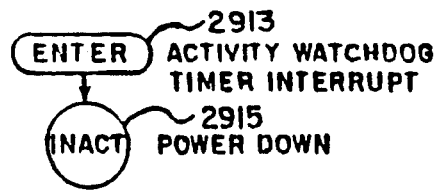

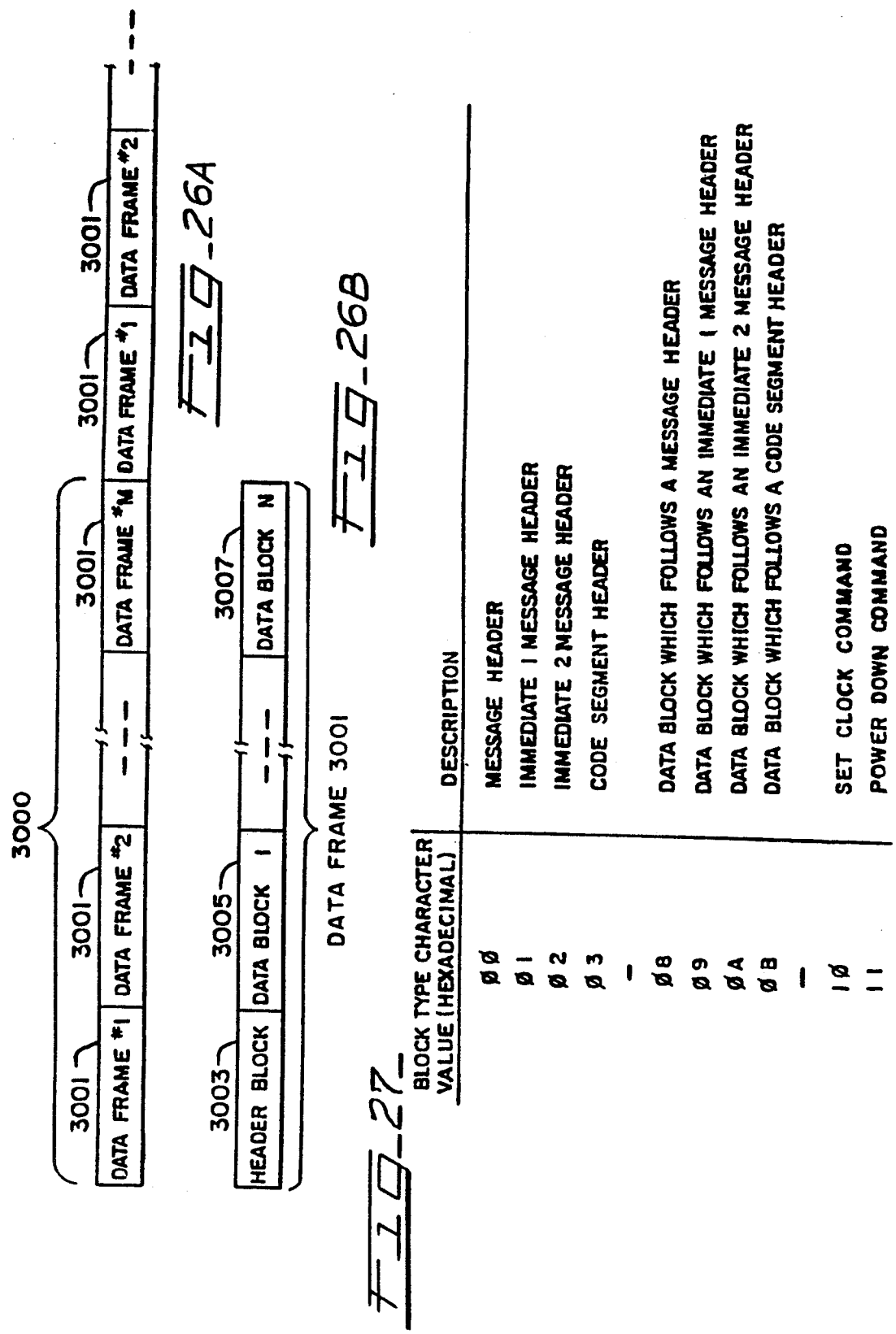

Fig. 28

| 3201 | 3202 | 3203 | 3204 | 3205 | 3206 | 3207 |
|---|---|---|---|---|---|---|
| PREAMBLE | FLAG | LENGTH | BLOCK TYPE | MESSAGE + VERSION NOS. | NO. DATA BLOCKS | CRC |
| 30 BIT-TIMES OF IDLE STATE | 1 CHAR. | 2 CHAR. | 1 CHAR. | 2 CHAR. | 2 CHAR. | 2 CHAR. |

| 3301 | 3303 | 3305 | 3307 | 3309 | 3311 | 3313 | 3315 |
|---|---|---|---|---|---|---|---|
| PREAMBLE | FLAG | LENGTH | BLOCK TYPE | MESSAGE + VERSION NOS. | NO. DATA BLOCKS | CONTROL + DATA | CRC |
| 30 BIT-TIMES OF IDLE STATE | 1 CHAR. | 2 CHAR. | 1 CHAR. | 2 CHAR. | 2 CHAR. | (L-7) CHARACTERS | 2 CHAR. |

| PREAMBLE 3401 | FLAG 3403 | LENGTH 3405 | TYPE 3407 | DATA AND CLOCK SET 3409 | CRC 3411 |
|---|---|---|---|---|---|
| 30 BIT-TIMES OF IDLE STATE | 1 CHAR. | 2 CHAR. | 1 CHAR. | (L-3) CHARACTERS | 2 CHAR. |

| PREAMBLE 3501 | FLAG 3503 | LENGTH 3505 | TYPE 3507 | POWER-UP DATA AND TIME 3509 | CRC 3511 |
|---|---|---|---|---|---|
| 30 BIT-TIMES OF IDLE STATE | 1 CHAR. | 2 CHAR. | 1 CHAR. | (L-3) CHARACTERS | 2 CHAR. |

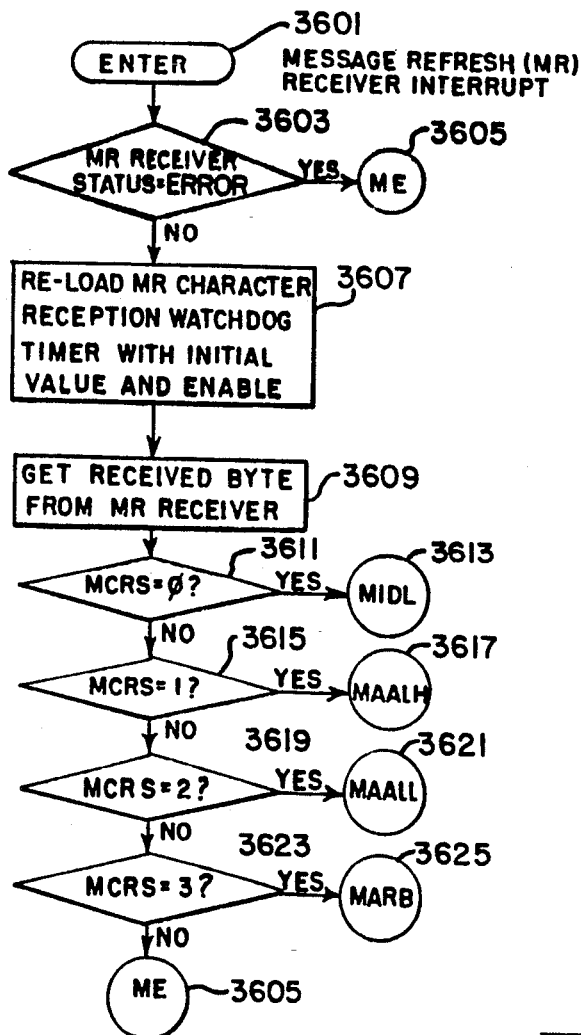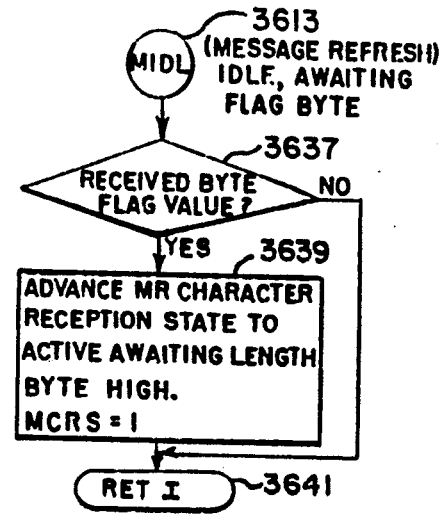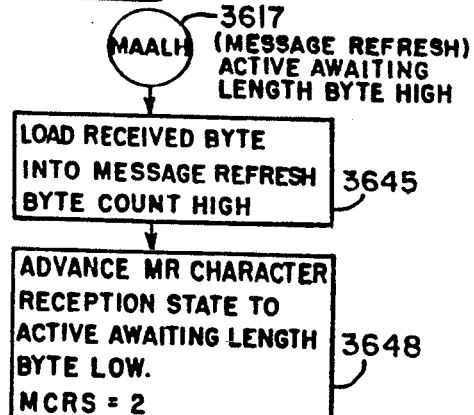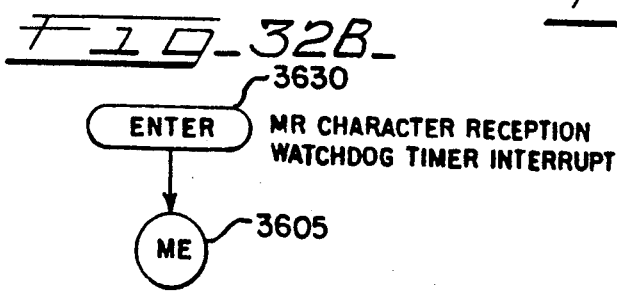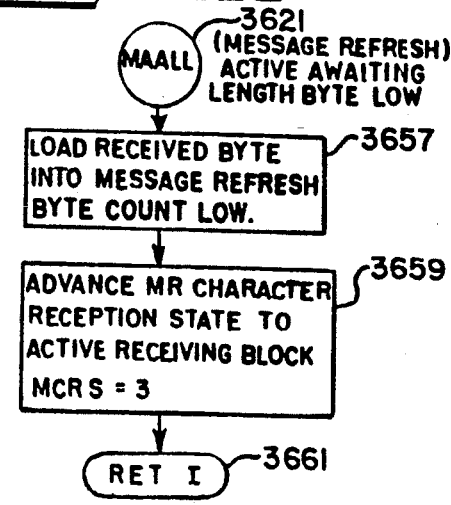

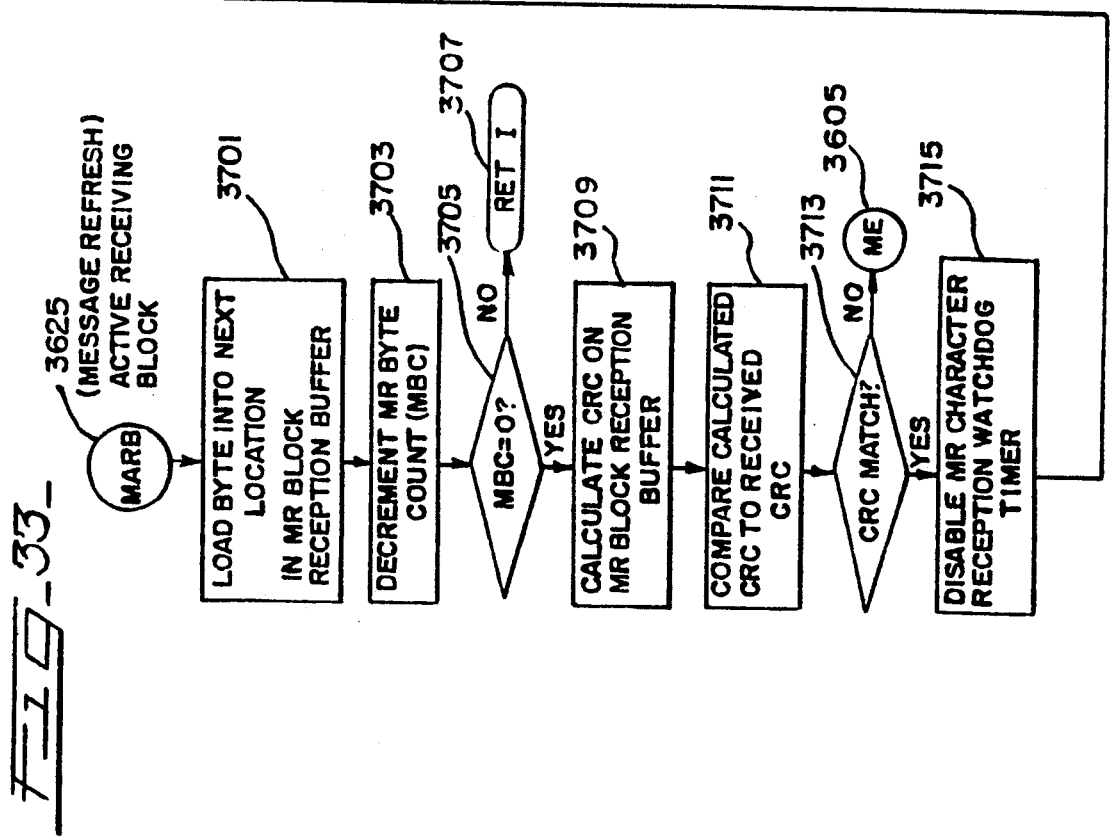

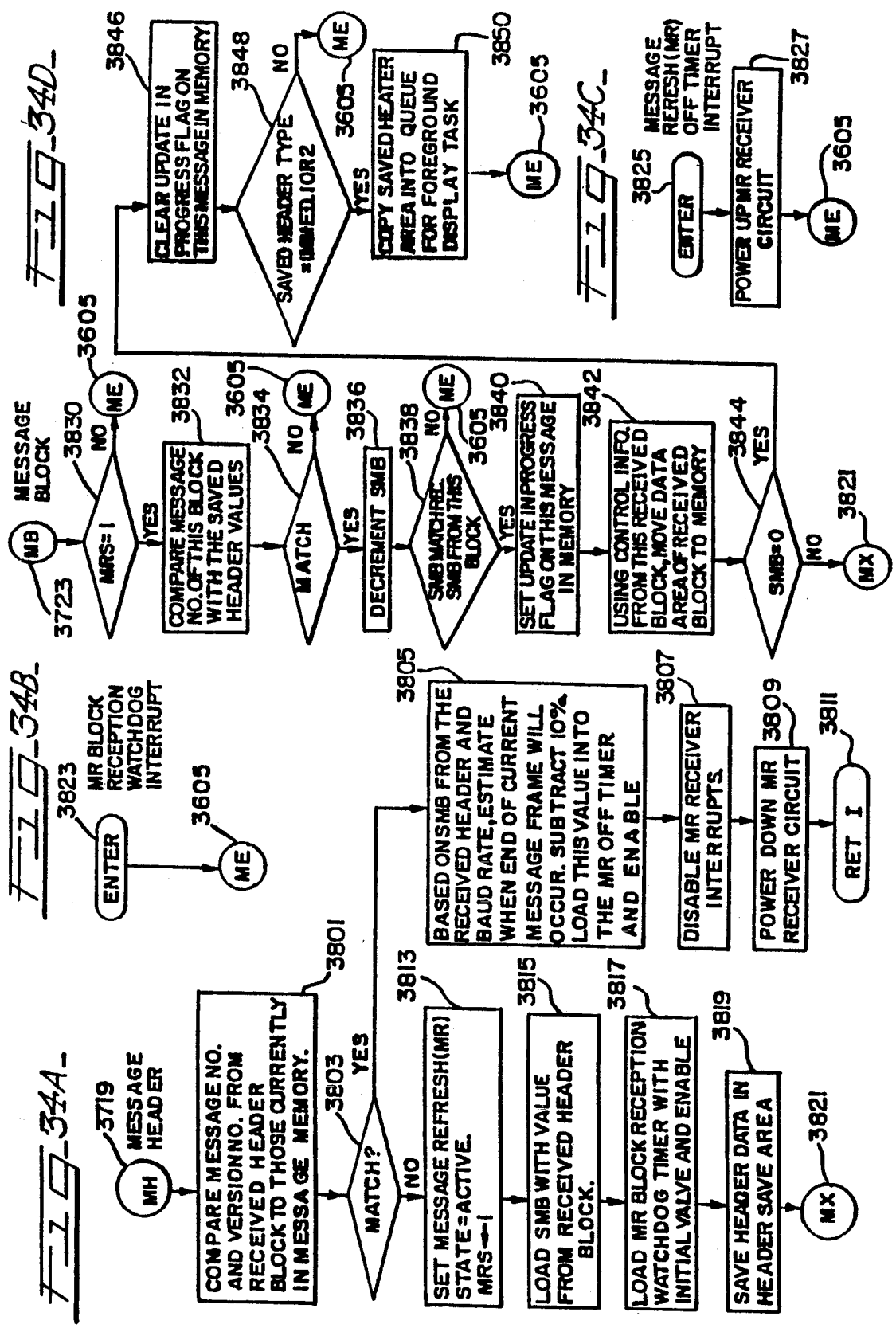

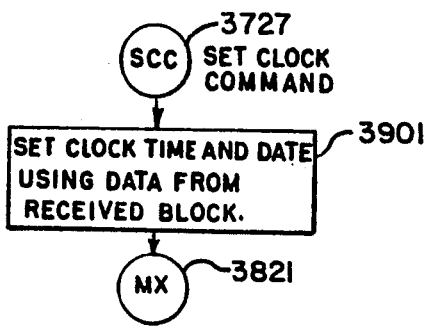
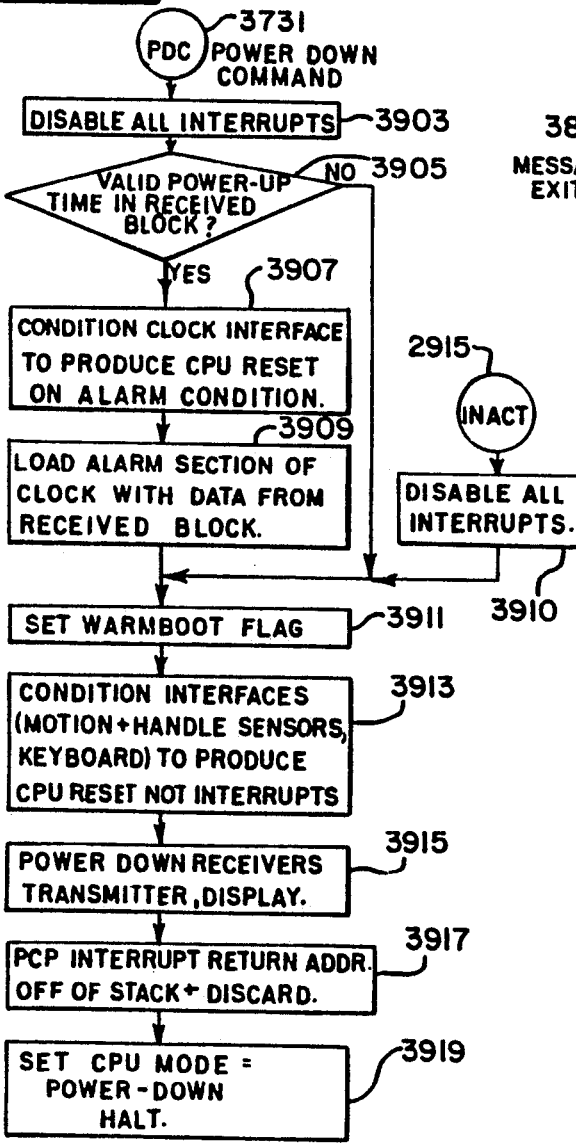
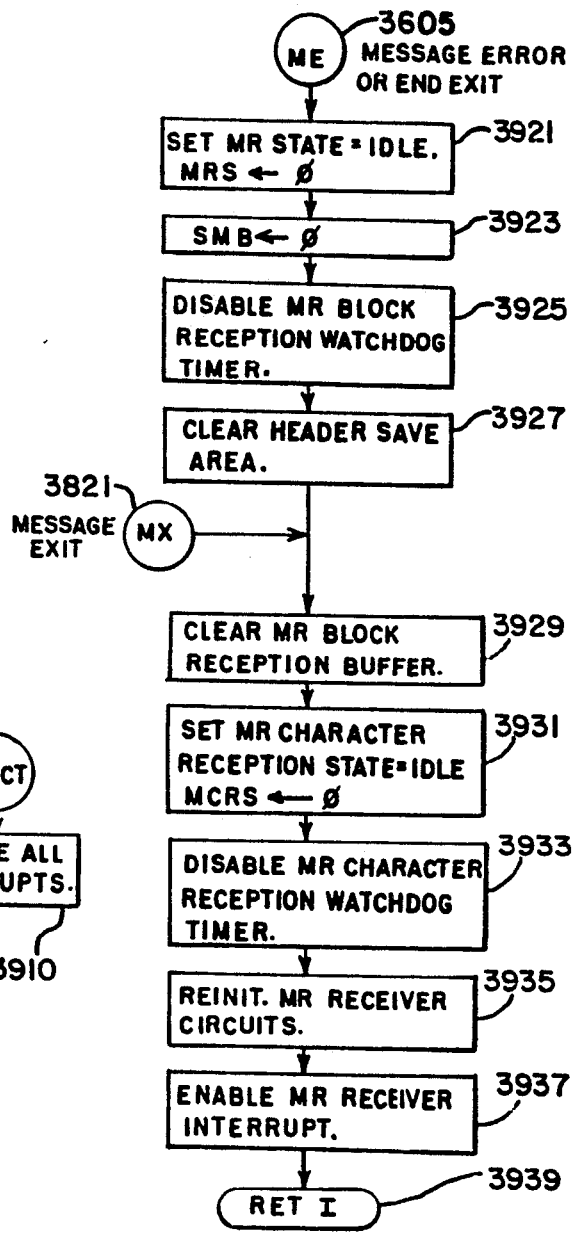

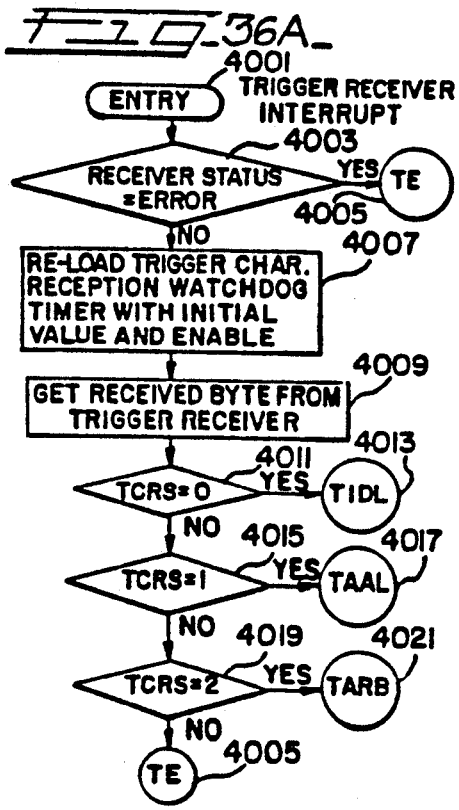
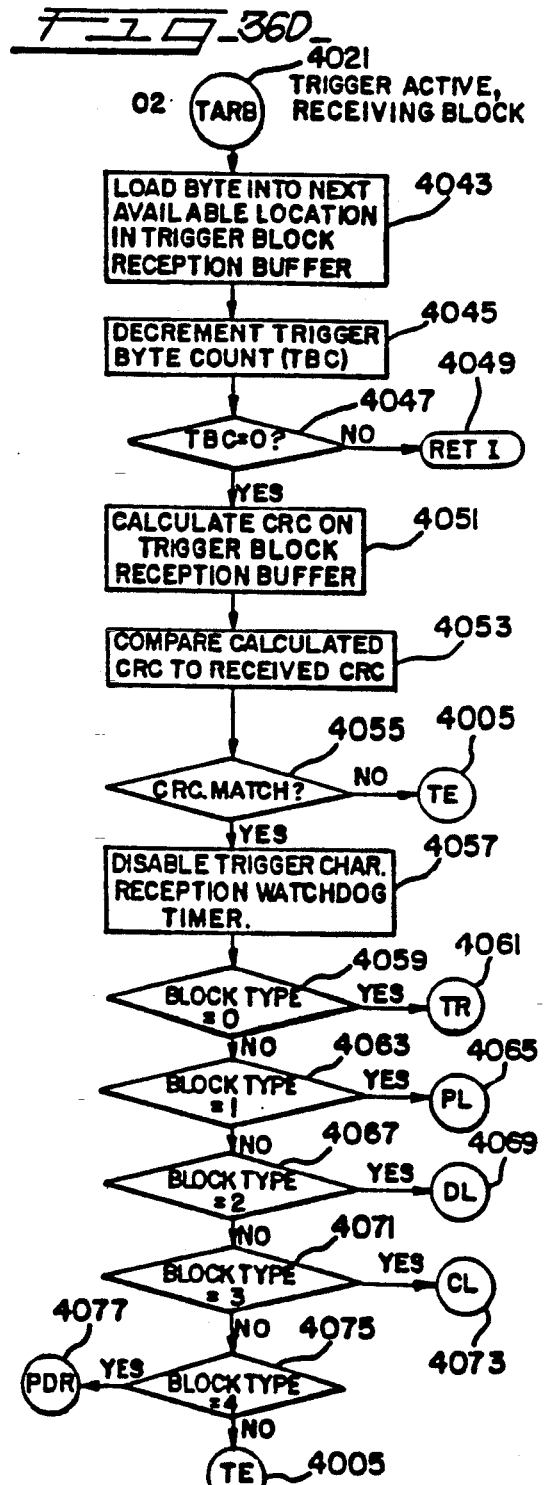
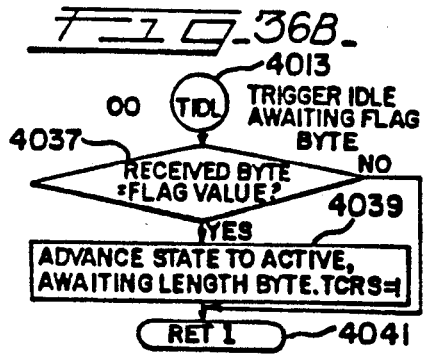
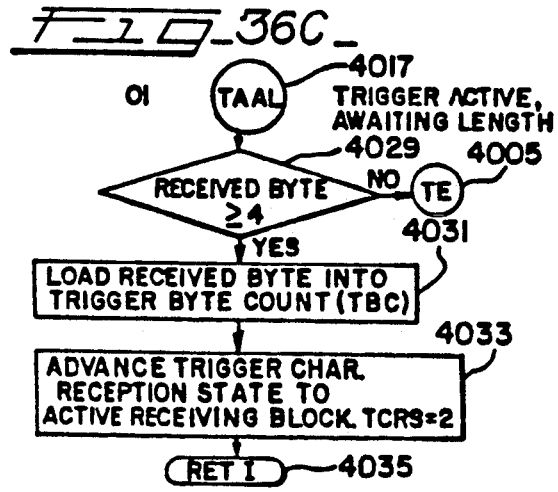

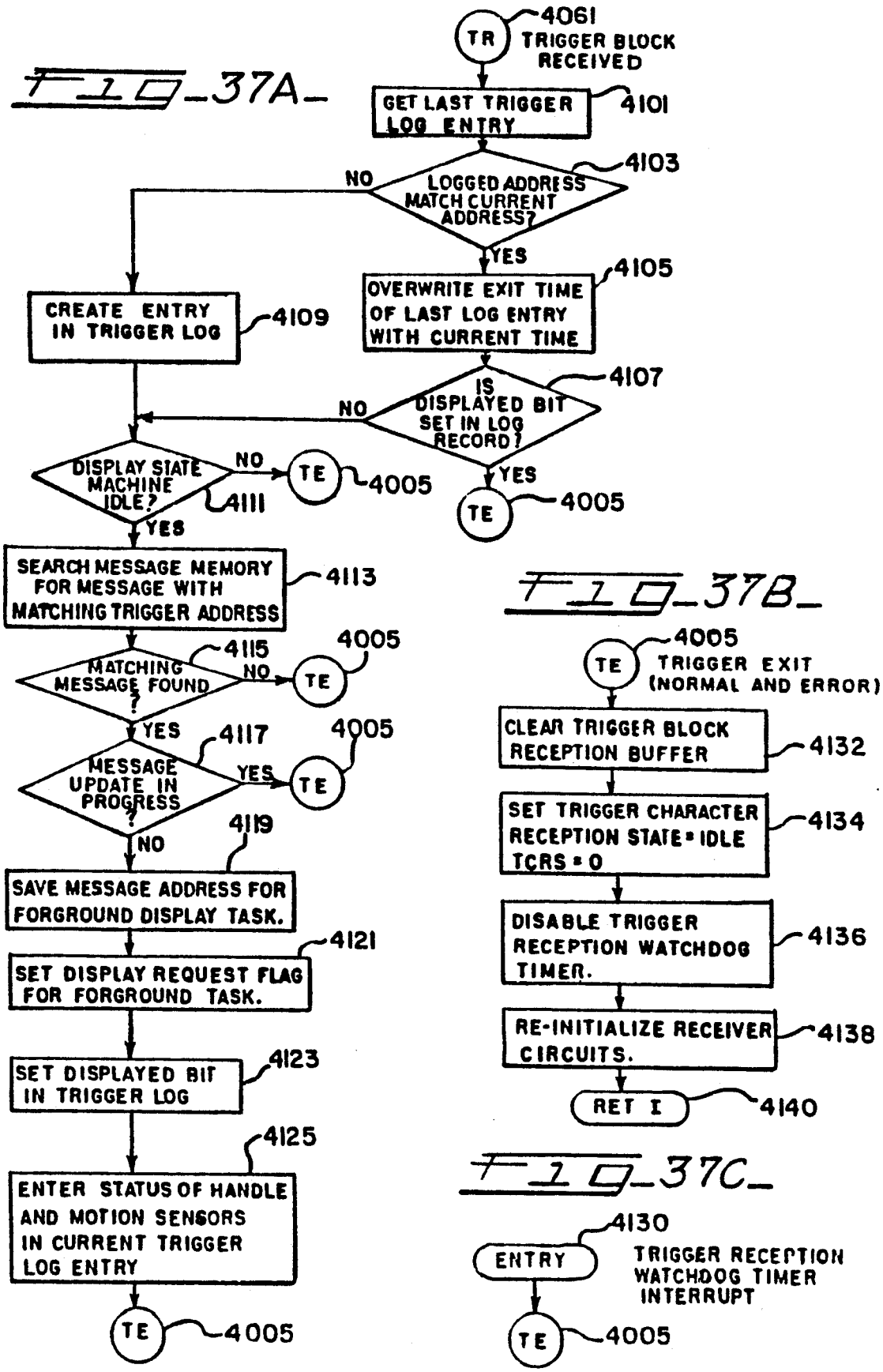

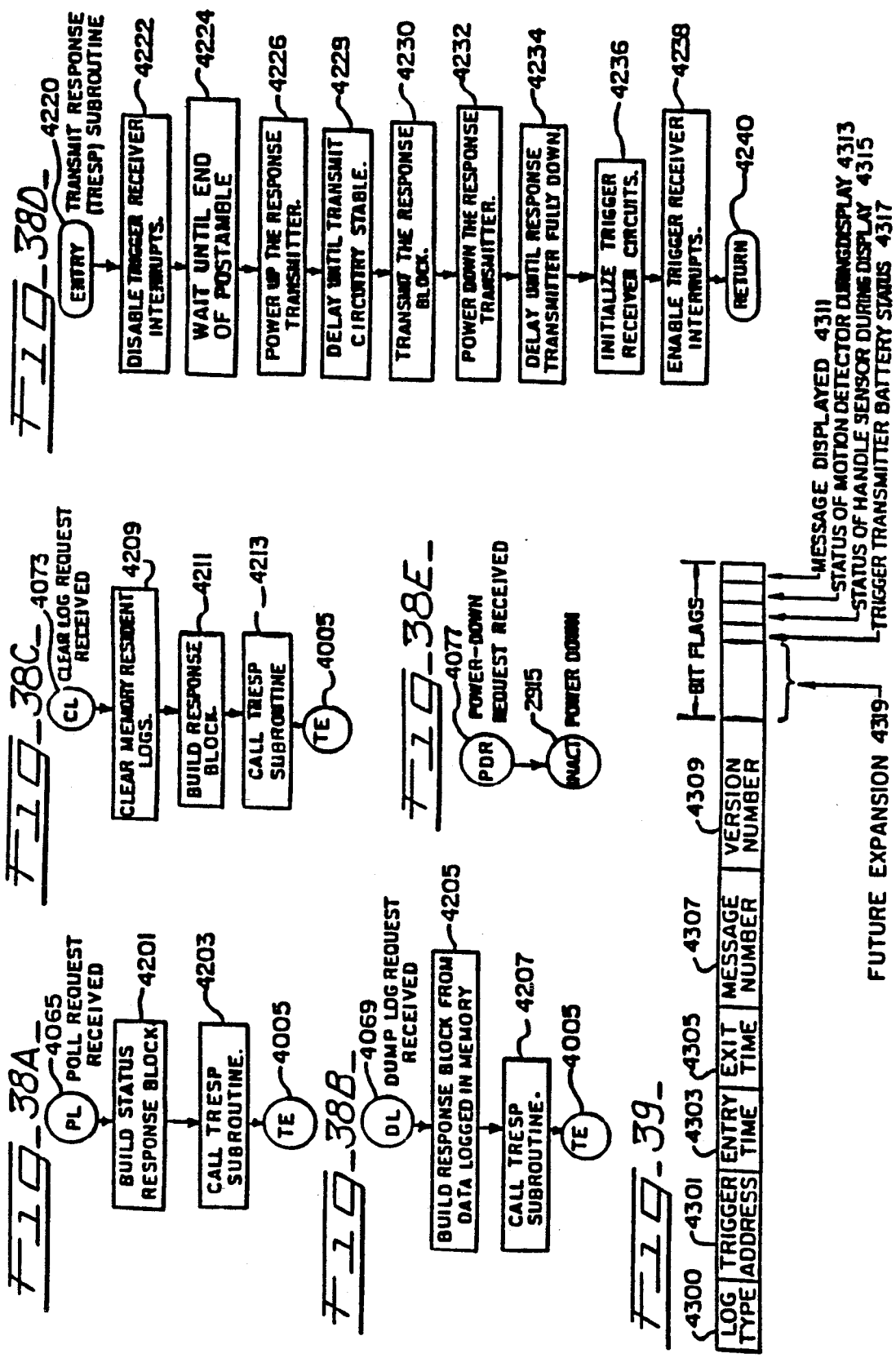

INTELLIGENT SHOPPING CART SYSTEM HAVING CART POSITION DETERMINING CAPABILITY

This is a continuation of application Ser. No. 07/435,500, filed Jul. 13, 1989, which is a continuation-in-part of application Ser. No. 99,288, filed Sep. 21, 1987, now U.S. Pat. No. 4,973,952.

BACKGROUND OF THE INVENTION

Consumer purchasing behavior may be influenced at different times in the purchase-consume-purchase cycle. For example, some grocery stores, in an attempt to influence future purchases, employ video screens located at checkout stations to display advertisements and offer coupons based on the items being purchased by a particular consumer. This type of system has not been entirely successful because the time of the advertisement's maximum influence on the consumer, i.e., during checkout, is temporally furthest from the time that the consumer can conveniently respond to the coupon or information. Because the individual consumer has just completed his purchases, it may be a relatively long time before he is in the store again.

Television advertisements, newspaper coupons and feature advertisements also influence the consumer during the middle of the purchase-consume-purchase cycle. Again, the effectiveness of these promotions varies with the time between the consumer's receipt of the promotional information and his next shopping trip.

In-store displays are more effective in influencing consumer purchases because they are encountered more or less contemporaneously with the actual item selection process. One type of in-store display, i.e., a point-of-purchase (POP) display, is generally physically a fixed display that promotes a single product or group of products and must be changed from time to time by store personnel, a time consuming and costly task.

Another type of in-store advertisement is the fixed paper placard attached to the front of shopping carts. As with POP displays, the placards must be changed periodically. Effectiveness of the placards is also limited, because they are quickly obscured by groceries as the cart is filled.

It is therefore an aspect of the invention to provide an advertising system that optimizes the effect of product advertisements by presenting the information just before the consumer is ready to make a purchase and that overcomes the limitations of known in-store promotions.

SUMMARY OF THE INVENTION

The present invention overcomes the disadvantages of the prior art by providing the consumer with dynamically changing advertisements and information that influence the consumer at the place and time of product selection.

The Shopping Cart Display (SCD) System of the present invention is a media system capable of delivering visual and aural messages to a consumer maneuvering a shopping cart through a store. Specifically, an electronic display device mounted on the cart can deliver unique messages depending on the location of the cart in the store. For example, if the consumer is in the bread department, a bread advertisement can be delivered. The cart can print coupons and dispense scents at appropriate locations. The display may also be mounted on hand-held shopping baskets present in many stores for those consumers purchasing only a few items. In the presently preferred embodiment, the display has a number of additional features. It can deliver news and information, interact with the consumer to distribute electronic coupons, provide deli numbers and recipes, play electronic games for entertainment and education, or perform convenience functions for the consumer, such as budget management.

The electronic messages displayed in the store may originate at a composition work station located in a remote studio or at a message creation work station located in the store. The message may contain text, including both still line and pictorial artwork, along with full notion video, graphic messages, and audio, including speech, music or attention alert tones. In the presently preferred embodiment, a series of universal Product Code (UPC) numbers, a unique ad identifier, and other data are included with the message.

The messages are sent from the studio via a communications network to a particular store or series of stores. SCD system computers located in respective retail establishments store messages that are intended for the respective locations. A retailer can also compose and insert local (store specific) ads into the store's SCD computer which transmits the active messages to all of the SCD displays located on the store's carts. Each SCD stores messages for subsequent display.

Throughout the store at various locations are transmitters mounted on the shelves or on any convenient structure, e.g., hung from the ceiling. Each transmitter radiates a unique electromagnetic signal that causes the SCD electronics to display, either immediately or after a time delay, an advertisement corresponding to that signal. In this manner, the transmitters act as signposts to inform the SCD of its location and orientation. Consequently, a bread ad is displayed while the consumer is in the vicinity of the bread section, and a cereal ad when he is in the vicinity of the cereal section, etc.

The features and advantages of the invention will be further understood upon consideration of the following description of the preferred embodiment taken in conjunction with the drawings, in which:

BRIEF DESCRIPTION OF THE DRAWINGS

FIG. 1 is a block diagram of a presently preferred embodiment of an SCD system according to the present invention.

FIG. 2 is a block diagram of a message composition work station of the SCD system shown in FIG. 1.

FIG. 3 is a block diagram of the central studio of the SCD system shown in FIG. 1.

FIG. 4 is an illustration partly diagrammic view of the in-store components of the SCD system shown in FIG. 1.

FIG. 5 is a block diagram of the store message transceiver shown in FIG. 4.

FIG. 6 is a block diagram of the trigger transmitter shown in FIG. 4.

FIG. 7 is an ideal trigger-transmitter zone coverage for the trigger transmitter shown in FIG. 6.

FIG. 8 is a practical trigger-transmitter zone coverage for the trigger transmitter shown in FIG. 6.

FIG. 9A is a perspective view of a preferred embodiment of the display and cart shown in FIG. 4.

FIG. 10 is a block diagram of the cart-based shopping cart display electronics mounted on the cart shown in FIG. 4.

FIG. 11A is a detailed block diagram of an RF embodiment of the trigger transmitter shown in FIG. 6.

FIG. 11B is a detailed block diagram of an infrared embodiment of the trigger transmitter shown in FIG. 6.

FIG. 12A shows a trigger transmitter power cycle for the trigger transmitter shown in FIG. 6.

FIG. 12B shows a plurality of power cycles as shown in FIG. 12A, illustrating an error condition.

FIG. 13 shows the format of characters used in the SCD system.

FIG. 14A shows the trigger transmission format for the trigger transmitters shown in FIGS. 6, 11A and 11B.

FIG. 14B shows the format of each trigger block shown in FIG. 14A.

FIG. 15 is a flowchart of the program for the trigger transmitters shown in FIGS. 6, 11A and 11B.

FIG. 16 is a diagrammatic illustration of the relative orientation of the trigger transmitter antenna and the trigger receiver antenna for the RF trigger transmitter shown in FIG. 11A and the RF trigger receiver shown in FIG. 17A.

FIG. 17A is a block diagram of an RF trigger receiver and response transmitter used in the shopping cart display circuit shown FIG. 10.

FIG. 17B is a block diagram of an infrared trigger receiver and response transmitter used in the shopping cart display circuit shown in FIG. 10.

FIG. 18A is a block diagram of an RF polling transceiver used in the shopping cart display circuit shown in FIG. 10.

FIG. 18B is a block diagram of an infrared polling transceiver used in the shopping cart display circuit showing in FIG. 10.

FIG. 19 shows the format of a transmission block sent by the polling transceivers shown in FIGS. 18A and 18B to the trigger receivers shown in FIGS. 10, 17A and 17B.

FIG. 20 shows the format of a transmission block sent by a response transmitter shown in FIGS. 10, 17A and 17B to a polling transceiver shown in FIGS. 18A and 18B in response to a poll request.

FIG. 21 shows the format of a transmission block sent by a response transmitter to a polling transceiver in response to a log dump request.

FIG. 22 shows the format of a transmission block sent by a response transmitter to a polling transceiver in response to a clear log request.

FIG. 23 is a flow chart of the foreground task performed by the SCD microprocessor shown in FIG. 10.

FIGS. 24A-D are flowcharts of the subroutines called during the foreground task performed by the SCD microprocessor shown in FIG. 10.

FIGS. 25A and B are flowcharts of subroutines performed when a motion sensor, a handle sensor, a keyboard, an activity watchdog timer or any other interrupt signal is presented to the SCD microprocessor shown in FIG. 10.

FIG. 26A shows the format of a message refresh transmission by the store message transceiver shown in FIG. 4.

FIG. 26B illustrates the format of a typical data frame in a message refresh transmission according to FIG. 26A.

FIG. 27 shows the message refresh transmission block types and indicia for the blocks shown in FIG. 26A.

FIG. 28 shows the format of a message refresh transmission message header block.

FIG. 29 shows the format of a message refresh transmission data block.

FIG. 30 shows the format of a message refresh transmission clock set command block.

FIG. 31 shows the format of a message refresh transmission power-down command block.

FIGS. 32A-E are flowcharts of a portion of the message refresh reception program of the central processing unit shown in FIG. 10.

FIG. 33 is a flowchart of another portion of the message refresh reception program.

FIGS. 34A-D are flowcharts of another portion of the message refresh reception program.

FIGS. 35A-C are flowcharts of another portion of the message refresh reception program.

FIGS. 36A-D are flowcharts of a portion of the trigger reception program of the central processing unit shown in FIG. 10.

FIGS. 37A-C are flowcharts of another portion of the trigger reception program.

FIGS. 38A-E are flowcharts of another portion of the trigger reception program.

FIG. 39 shows an example of a trigger reception log entry into memory shown in FIG. 10.

DESCRIPTION OF PRESENTLY PREFERRED EMBODIMENTS

Figure 9B:
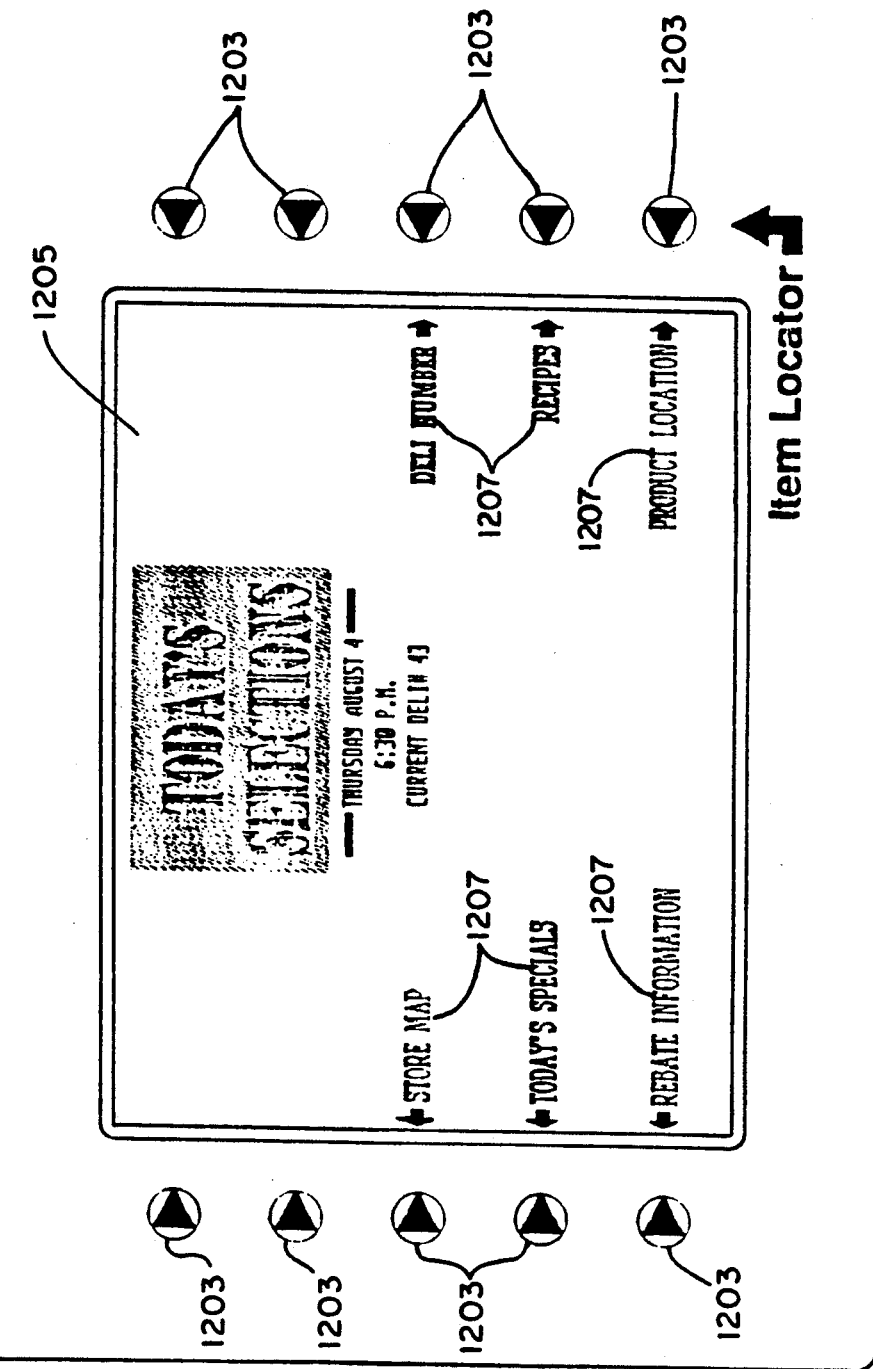
FIG. 9B is front view of an alternative embodiment of the display shown in FIG. 9A.

FIG. 1 is a diagram of a Shopping Cart Display (SCD) system according to the present invention. Electronic messages are created on computer work stations 401 (FIG. 3) located at a central studio 103. Alternatively, a message may be generated at work stations at an advertising agency 100, a manufacturer 101, a retail chain headquarters 110, or at any other remote location that is equipped with a compatible work station. In this event, the completed ads can be communicated to the central studio 103 via floppy disk, magnetic tape, modem and telephone line, satellite network, etc. 102. Also, work stations may be equipped with a display that simulates the cart-based display electronics 514 described below. This allows newly created ads to be tested in a real-life situation to judge their visual and aural impact and appropriateness and/or the effect of scent. Additionally, local messages can be created directly at the selected retail store 107 on a local message composition work station 506. The ability to create ads at the store allows the store manager to insert his own store-specific messages (e.g., store welcome messages, manager's specials, daily specials, and close-out sales).

The central studio 103 attaches additional information to ads received from remote work stations 100, 101, 110 in anticipation of sending the ad over a communications network 105 to a specific store or stores 107. The information may include the ad "flight" (starting date and time to stopping date and time), a list of store network addresses, whether a coupon and/or scent is to be dispensed, the Universal Product Codes (UPCs) or article numbers associated with the ad, and a unique ad identifier.

The message and added data are sent via a bidirectional bus or link 104 to the communications network 105, which may be located at the central studio 103 or elsewhere. The network 105 routes the messages and data over a bidirectional link 106 to an appropriately addressed store or chain of stores 107. The unique addressing allows complete flexibility in distribution of messages. Return data from the stores 107 may be sent back to the studio 103 via the communications network 105 and links 104, 106.

At a particular store 107, the messages are forwarded to SCD electronics 514 (FIG. 4) mounted on product-carrying devices, such as shopping carts 500 and handheld shopping baskets. Subsequent references to shopping carts 500 herein includes all product-carrying devices where the context permits. The SCD electronics 514 keeps the messages in memory. When a cart 500 is in the proximity of a trigger transmitter 512, an appropriate message 108 is displayed to the consumer 109, either immediately, or after a time delay. The message 108 is determined by the composition of the trigger signal from a trigger transmitter 512 and previously encountered trigger signals from other trigger transmitters 512. The trigger transmitters 512 thus act as sign posts as the customer moves the cart 500 about the store.

FIG. 2 is a block diagram of a message composition work station 100, 101, 110, 401. It is based on a personal computer 300 with a hard disk drive and at least one floppy disk drive, a standard display device 301 (e.g., a cathode ray tube (CRT)), and a keyboard 302. For ease of graphic image entry, an optional copy camera with digitizer, or document scanner 303 can be attached. For ease of graphic image editing, an optional pointing device (e.g., mouse or light pen) 308 can be attached. An optional display device 304 which emulates the SCD electronics 514 present on the carts 500 in the retail stores may also be attached to the computer 300. The display emulator 304 allows messages to be presented in the exact way that they will ultimately be presented in the store (video and audio). It may include a printer or scent dispenser. An optional telephone modem 305 allows networking with a studio billing and control computer 400 at the central studio 103 for transfer of completed messages over a telephone line 306. Alternatively, messages may be transferred by manually transferring floppy disks or tapes over a delivery link 307 to the studio billing and control computer 400. It is also within the present invention to utilize any other convenient communications network.

The telephone line 306 and/or the disks and tapes delivery 307 may comprise the communications line 102. The message composition work stations 401 are connected to the studio billing and control computer 400 over a communications link 402. The software operating on the personal computer 300 preferably includes a graphics image editor which allows composition of graphics and text messages, graphics image capture via copy camera or document scanner 303, graphics animation, audio composition, and image storage and retrieval. The software also includes a program for driving the display emulation hardware, and for compressing the completed messages before transmission via the floppy disk and tape delivery 307 or modem 305 and line 306. Messages can be compressed in several well known ways: one dimensional run length encoding or two dimensional Relative Element Address Designate (READ) coding (similar to the CCITT Group III and IV digital facsimile standards); conversion to North American Presentation Level Protocol Syntax (NAPLPS); conversion to PostScript or PreScript; conversion to Initial Graphics Exchange System (IGES); conversion to Electronic Design Interchange Format (EDIF); or conversion to the Graphic Kernel System (GKS). Other techniques may prove advantageous as the art progresses.

FIG. 3 is a more detailed diagram of central studio 103 with an associated billing computer system. The studio 103 includes a series of message composition work stations 401 tied together in a known manner by the communications link 402, which may comprise a Local Area Network (LAN) to facilitate production of SCD system messages. The LAN 402 connects all of the studio work stations 401 to the billing and control computer (BCC) 400. After messages are composed, they are transmitted to the BCC. Messages composed at off-site work stations are received over the telephone line 306 via a telephone modem 405, and/or floppy disks and/or magnetic tapes delivery 307. Other inputs to the BCC are time and date via a radio-coordinated clock 407, local terminals for advertising account executives 408, and external data sources 409 such as United Press International, Dow Jones data services, and Silent Radio. The BCC has local disk storage 403 and printer facilities 404.

The operating system of the BCC 400 accepts SCD system messages, attaches additional data to the messages from the local data base, prints acknowledgments of the messages for verification of off-site clients and account executives, and, based on information retrieved from the data base, forwards the messages over the communications link 104 for distribution to the stores via a Wide Area Network (WAN) communications network 105. The messages are also logged for client billing and collections purposes.

Several cycles of start and stop dates and times can be loaded into the data base of the BCC to schedule an advertisement's "flight" and "hiatus" durations automatically. These can be loaded via the work stations 401 or the local terminals 408 by account executives.

The data base resident in the BCC 400 also may contain games and other information that are periodically downloaded via the WAN 105 into computers 502 located in the stores 107 and subsequently into the display devices 514 on the carts 500.

The BCC software also accepts data returned from the stores 107 to the studio 103 via the WAN 105. Data from the In-Store Computer 502 and the in-store scanning system 510 (store purchase data) can be returned to the studio billing computer via the wide area network. The BCC can produce reports for the clients, advertising agencies, and retailers. One possible report is on the path of the carts through stores for store traffic pattern analysis. This is based on trigger reception log entries returned by the carts to the ISC 502 and ultimately to the BCC 400. Reports may be made on which ads were shown and at what frequency. Reports may be made on which ads were shown and how many consumers purchased the advertised product. Reports may be made of answers to consumer surveys displayed on the carts.

Market research can be conducted on the effectiveness of the cart-based advertising. The ads can be targeted so that one group of carts display an ad "A" while other carts display an ad "B". In the television research area this is called a Copy Test. The effectiveness of frequency of advertising can also be tested. This is called a Weight Test. This kind of testing may be performed in the manner described in Eskin et al., U.S. Pat. No. 4,331,973.

The WAN 105 may be constructed following any of a number of well known technologies or combinations thereof such as direct satellite links, terrestrial microwave links, Multiple Address System (MAS) radio frequency links, subcarrier links from FM broadcast stations, fiber optic links, laser optical links, Integrated Services Digital Network (ISDN) offered by phone companies, T1 service offered by phone companies, dedicated phone lines with modems, dedicated phone lines with line drivers, and conventional non-dedicated dial-up telephone lines with modems, or other means, as technology advances.

The WAN 105 routes individual messages to the individual retail stores or groups of stores 107 based on addressing information contained in the messages and the respective store address loaded into each of the SCD in-store computers 502. Following accepted protocol, each store has a unique address. The address consists of two parts, a chain address and a store address within that chain. The computers 502 are programmed in a manner well known in communications to recognize their own addresses and accept only messages directed thereto, including messages directed to all stores. The WAN 105 also handles such broadcast messages (i.e., messages that are to be received in all stores connected to the WAN). The time and date are examples of messages that may be received by all of the stores 107.

The WAN 105 also routes return information from the respective stores 107 to the studio 103 in a manner known in the art.

FIG. 4 shows the in-store components of the SCD system. A communications device 501 interfaces to the Wide Area Network 105 over the communications link 106. FIG. 4 depicts the communications device as a satellite dish for interfacing with a satellite-based WAN 105 Whatever hardware or transmission link 106 is used, the device 501 would include associated demodulating circuitry to convert the incoming signal into computer readable form. If the WAN 105 is bidirectional, the device 501 also includes modulation and transmitting capabilities. Devices of this type are well known in the art. Messages for a respective store 107 arrive on a line 518.

The SCD System In-Store Computer (ISC) 502 compares the store address transmitted in each message with its own unique address in a manner well known in communications. If the addresses match or if the message is a broadcast transmission which is destined for all stores, the ISC 502 accepts the message and optionally spools it to local nonvolatile storage such as A message that is to be displayed on the SCD electronics 514 is merged with data from the local data base present in the ISC 502. This data base contains shelf location information in respect to respective trigger transmitters (TT) 512. This data base is kept current by store personnel. Universal Product Codes (UPCs) or article numbers associated with the message may be checked via the well known in-store scanning system 510 over a communications link 509 to ensure that the advertised products are present in the store.

Locally generated messages may be created by a local message creation work station 506 (optional) and transferred to the ISC 502 via a communications link 507. This allows the store manager to create his own messages as to welcome shoppers to his store, to advertise the stores monthly, weekly, daily or hourly specials, along with any special promotions in the meat department, delicatessen, bakery, etc. The store manager edits a data base in the ISC 502 to control flight and hiatus of the respective locally generated ads.

Other local store data can be input to the ISC 502 via a communications link 508. In the preferred embodiment, the ISC contains a "product look-up" table that enables consumers to find a particular product by making the appropriate selection at a keyboard 901 (FIGS. 9A and 9B) of the SCD electronics 514 on the cart 500. In addition, data showing which ticket number is currently being served in the deli, the winning-state lottery numbers for the day, and local news or financial information may also be entered in the computer 502 for display on all the carts 500 in the store 107. Public service information such as weather warnings, may also be entered into the ISC and transmitted to the SCD's. Other uses including ones similar to an audio public address system may be made of the SCD. In addition, the SCD's may provide an interactive store directory for locating products and services.

To make the wait in line at the checkout counter appear shorter, the SCD can be used to play games. Trivia games, brain teasers, hangman, etc. can be played. The games are loaded in the ISC 502 via the WAN 105 or locally via the composition work station 506. Consumers interact using the cart-based electronics 514 and overlaid keyboard 901 described below.

All data required for SCD system operation is sent storewide by the ISC 502 to the SCD electronics 514 present on each of the carts 500 by a Store Message Transceiver (SMT) 503. The SMT 503 transmits radio signals containing the messages over radio links 504. An RF SCD Message Transceiver (SCD) 1317 (FIG. 10) on each of the carts 500 receives the message signals from the SMT 503. The signals are then converted into digital messages. If the messages are to be displayed only when triggered, they are stored in a memory 1306 in the cart electronics 514. If the messages are for immediate display and the cart is active (recently in motion), the message is uncompressed and displayed.

A large number of Trigger Transmitters (TT) 512 are located throughout the store in various categories and departments. They may be mounted on or under the shelves or on the floor. In aisles where shelves are not present (e.g., soda pop, meat, frozen foods) TT's 512 can be hung from the ceiling or otherwise located in the vicinity of the product. TT's transmit at a very short (approximately 1%) duty cycle to conserve their battery power. Each TT 512 in a given store 107 has a unique address which it transmits as part of its trigger message.

When the SCD cart-mounted electronics 514 receives a valid trigger transmission 513 of adequate amplitude (i.e., the cart is within the trigger transmitter zone), it searches its memory for any message with the corresponding trigger address. If an address match is found, the message associated with that address is displayed either immediately or after a time delay. This is how a bread message (e.g., an advertisement) is displayed in the vicinity of the bread section, etc. In the presently preferred embodiment, the SCD electronics 514 logs all received trigger addresses, and the displayed message directs the consumer's attention to the left or right depending upon which trigger signals have previously been encountered.

The SCD electronics 514 stores every valid unique trigger transmission and the date and time that it receives it as the cart 500 traverses the store 107 to form a log of all the places that the cart has been. This log is uploaded to the In-Store Computer 502 during check-out at point-of-purchase station 515. Located at the station 515 is a polling transceiver 516, the electronics of which may be like the trigger receiver and response transmitter 1313 of the SCD electronics 514, except that the data processing is done by the ISC computer 502, which receives data from transceiver 516 via a communications link 517. The log is then cleared in anticipation of the next shopping trip. The data are merged with the trigger transmitter location information and up loaded to the studio 103 for analysis. Alternatively, the polling can be effected over the radio link 504 between the SCD Message Transceiver 1317 and the Store Message Transceiver 503.

Consumer surveys can be conducted via the SCD system. System messages in the form of questions are composed at a work station 100, 101, 110, 401 and transmitted to the SCD electronics 514. Responses are entered by the customer on the keyboard 901 and logged in memory 1306 as log records on the cart 500. These responses are up loaded from the cart 500 to the ISC 502 during check-out time through the polling transceiver 516 and ultimately returned to the studio 103. Alternately, the responses can be transmitted over the radio link 504 between the SCD Message Transceiver 1317 and the Store Message Transceiver 503.

The Trigger Transmitters (TT) 512 may be easily attached and removed from the shelves. This facilitates easy TT exchange, relocation and battery replacement by store personnel. When items on the shelves are relocated, the TT's must be relocated also. Store personnel must keep the TT location data base resident in memory in the ISC 502 up to date.

Rechargeable batteries 1322 in the SCD cart-based electronics 514 are recharged by a known battery recharging system 505. This can be accomplished, for example, by an inductive pick-up (electric transformer secondary coil) mounted in the cart 500. A corresponding inductive transmitter (electric transformer primary coil) can be mounted in the cart storage area. When the cart 500 is in storage, recharge energy will be magnetically transferred to the cart from a power source. Electrical contacts could also be used to transfer energy into the cart. While in storage, electrical contacts mounted on the cart 500 would connect with corresponding contacts mounted in the storage area to transfer energy. Alternatively, photovoltaic cells (i.e., solar cells) can provide recharge energy via ambient light, sun light, or auxiliary lighting placed over the cart storage area. A wheel driven generator 1326 could also be employed to convert energy derived from the motion of the cart 500.

As a further alternative, in the presently preferred embodiment, the battery recharging system 505 may utilize removable battery packs wherein discharged battery packs are removed and exchanged with recharged ones by store personnel. The spent packs are placed in rechargers in anticipation of the next exchange.

FIG. 5 is a block diagram of the Store Message Transceiver (SMT) 503 which receives data over a communications link 600 from the SCD In-Store Computer (ISC) 502. In one embodiment, the SMT comprises a modulator-demodulator or modem 601 which includes a frequency shift keyed (FSK) modulator that modulates the frequencies. The modulated signal is transmitted over the radio link 504 throughout the store 107 by an RF transceiver 602. The SMT VHF transmissions are authorized under FCC Part 90.267 "Assignment And Use Of 12.5 KHZ Frequency Offsets". Since the SMT 503 is continuously transmitting to refresh the messages stored in the carts, batteries are impractical as a power source for the SMT. It is powered by alternating current (AC) power mains 605 via a power supply 604.

Alternatively, the SMT transmissions could be via low-frequency radio-frequency (LFRF) transmissions, microwave radio-frequency transmissions, or infrared (IR) transmissions, or other FCC Part 90 authorized transmissions.

FIGS. 26A, 26B, 27, 28 and 29 show examples of an SMT data transmission, which is in accordance with a well known digital data transmission format. The SMT 503 continuously repeats a series of M data frames 3001 (FIG. 26A). Each data frame 3001 consists of a header block 3003 and a series of data blocks starting with block 1 3005, and ending with block N 3007 (FIG. 26B).

Each header block 3003 (FIG. 28) includes idle time 3201 followed by a flag byte 3202, and a length indicator 3203. The idle time 3201 preferably, as shown, comprises 30 bit-times. The flag byte is in the form of an 8-bit character with a start bit and a stop bit to provide synchronism.

The length indicator tells how long the data part of the header block 3003 is. In the case of a header block, there will be 7 following characters. Hence, the length indicator indicates 7. The length indicator is in two characters, each of 8 bits with start and stop bits. Next comes a block type indicator 3204. It indicates whether the next data are part of a header block 3003 or a data block 3005, 3007. That is, it will indicate in a single character the various block types shown in FIG. 27 is being sent. In the case of a header block 3003 the block types will be from $\phi\phi$ to $\phi 3$ hexadecimal):

$\phi\phi$ Message Header, indicating type $\phi 8$ data blocks will follow.

$\phi 1$ Immediate 1 Message Header, indicating type $\phi 9$ dated blocks will follow.

$\phi 2$ Immediate 2 Message-Header, indicating type $\phi A$ data blocks will follow.

$\phi 3$ Code Segment Header, indicating type $\phi B$ data blocks will follow.

The data blocks of types $\phi 8$, $\phi 9$, $\phi A$ and $\phi B$ have the format shown in FIG. 29, which will be discussed further below. In the case of a header block 3003, after the Block Type indicator 3204 appears a two character (8 bits per character) SCD message number and version number 3205 identifying the particular message of types $\phi 8$-$\phi B$ that is to follow in the issuing message blocks 3005, 3007. There follows a two character (8 bits per character) indicator 3206 of the number of subsequent message blocks 3005, 3007. Finally a two character (8 bits per character) error detection check sum or cyclic redundancy check (CRC) 3207 follows for verifying the integrity of the block in a known manner. The check characters may be in accordance with well known error correcting codes and may be used to correct data in a well known manner.

The SCD cart-based electronics 514 responds to the header and makes a decision during the idle time 3301 (FIG. 29) part of the following data block 3005. It first computes the check sum or CRC for the header block 3003 and compares it to the transmitted check sum or CRC 3207 to determine that the header is valid and error free. If the header is valid (or is corrected using an error-correcting code), the SCD 514 checks the message number and message version 3205 against the message and version numbers it has previously stored in memory. If there is a match, the SCD has previously stored the message that is in the following data blocks 3005, 3007 of the current frame. The SCD can turn off the SCD Message Transreceiver 1317 and "go to sleep" (to save battery life) during the remainder of this data frame. It knows how many data blocks are in the current frame from the header information 3003. It can measure the transmission rate and calculate the time duration of the rest of the current data frame. It then sets and starts a timer that will "wake up" the SCD electronics 514 in time to read the next header block 3003. This minimizes the power consumption of the cart-based electronics to maximize battery life.

If the message number and version number do not match any message numbers or version numbers in memory, the SCD 514 reads and validates the remaining data blocks (1) 3005 through (N) 3007 of the current frame and loads the message into memory. It then continues with the next data frame and header.

FIG. 6 is a block diagram of the Trigger Transmitter (TT) 512. A Transmission Controller 800 contains in memory a unique TT address, and a power sequencer. A data modulator and transmitter 801 generates a modulated signal that is coupled to a radiator 802 that transmits the signal over a transmission link 513. The unique address is placed in memory in any convenient manner, as upon manufacture of the TT 512. It is this address that identifies the particular TT 512 and is the information that is transmitted by the data modulator and transmitter 801 to identify the TT to the SCD 514 and thereby locate the cart 500 in the store 107. The power sequencer provides for periodic operation of the data modulator and transmitter 801 in order to limit power consumption. Power is supplied by a power supply 804, preferably in the form of a battery pack. From time to time store personnel replace the battery packs with charged packs. The Trigger Transmitter 512 has two preferred embodiments, radio frequency (RF) as shown in greater detail in FIG. 11A and infrared (IR) as shown in greater detail in FIG. 11B.

FIG. 11A shows the RF embodiment of the Trigger Transmitter 512 in detail. The RF Trigger Transmitter 512 is designed to consume minimal power. This is to maximize the service life of the battery 804. The only part of the transmitter which has continuous power is a power-off timer 1502. Its output signal is low for approximately 5 seconds after it is triggered, and then it goes high. This high signal activates a power switch 1503 (a power MOS FET) which allows battery power to be applied to a voltage regulator 1504 and the battery sense input of a battery state detector 1507. The voltage regulator 1504 supplies power to the remainder of the trigger transmitter circuitry. On power-up, a reset circuit 1506 holds a microprocessor 1505 in its reset condition until the power is stable and a microprocessor clock crystal 1509 is stable. The microprocessor 1505 then begins executing the program detailed in FIG. 15 and explained in detail below. The microprocessor 1505 is an 87C51 type manufactured by Intel Corporation. It contains an on-chip program storage which is implemented as an Erasable Programmable Read Only Memory (EPROM). The program is loaded into the EPROM at the time of manufacture of the RF trigger transmitter 512.

When the battery voltage is below the reference, the battery is nearing the end of its life. Store personnel must be alerted to replace the battery before it fails. The battery state detector 1507 determines this condition by comparing the switched battery voltage on a line 1516 against its internal reference voltage. If the voltage is above the reference, a logic 1 is returned to the microprocessor 1505. If it is below the reference a logic 0 is returned to the microprocessor 1505.

A Dual In-line Package (DIP) switch 1508 provides 7 Single Pole Single Throw (SPST) switches. The switches are set by personnel in a binary fashion to indicate the address of a respective Trigger Transmitter 512. Each Trigger Transmitter 512 has a unique address which indicates a unique location within the store. The trigger address is applied to the microprocessor 1505.

The microprocessor 1505 operates as described below in connection with FIG. 15 to provide a coded signal indicating battery status and Trigger Transmitter address to the data modulator and transmitter 801. in the data modulator and transmitter 801, a 400 KHz oscillator 1510 provides a carrier to a Phase Shift Keyed (PSK) Modulator 1511. The PSK modulator 1511 either passes the carrier signal through with no change or it provides a 180 degree phase shift, under control of the data input signal on line 1515 provided by the microprocessor 1505 to the modulator 1511. A logic inverter 1512 and two power drivers 1513 (each a power MOS FET) provide current gain and complementary drive to the radiator 802, comprised of a loop antenna coil 1514. The antenna coil 1514 is resonant at 400 KHz.

The battery status and trigger transmitter address are thus communicated by the trigger transmitter 512 to the electronics 514 on all shopping carts 500 as they pass by. As the shopping carts go through the check-out lane, they are polled by the polling transceiver 516. This information is passed on to the ISC 502 by the link 517. Alternatively, battery status can be communicated over the radio link 504. Once a day or on demand, the ISC 502 prints a list of Trigger Transmitters 512 that have low batteries 804 so that store personnel can service the batteries in the transmitters.

FIG. 11B shows the infrared (IR) embodiment of the Trigger Transmitter 512 in detail. Functional blocks that have the same reference number operate in a similar manner as described for FIG. 11A. The oscillator 1510 in this embodiment now operates at a frequency of 38.4 kHz. The modulator 1511 is a Pulse Amplitude Modulator (PAM). It provides binary (on-off) keying of the carrier signal generated by oscillator 1510. The asynchronous data transmission rate is reduced to 1200 baud. The power driver 1513 receives voltage from the voltage regulator 1504. The power driver 1513 provides current gain to the signal from the modulator 1511 and drives the infrared emitter 1518. The infrared emitter 1518 comprises one or more infrared (IR) light emitting diodes (LEDs). The IR LEDs are physically oriented along the shelf edge or over the store aisle to approximate the desired Trigger Transmitter zone coverage.

FIGS. 12A and 12B show the trigger transmitter power cycle 1600 of the transmission controller 800. At an interval 1601 the power-off timer 1502 is running, and power to the rest of the transmitter is off. At a point 1602 the timer completes its timing cycle and powers-up the rest of the transmitter circuitry for an interval 1603. After the power-up reset cycle of the power reset circuit 1506 is complete, the microprocessor 1505 executes its program (FIG. 15). To provide forward error correction and establish reliable communications, the microprocessor 1505 transmits a trigger block 1803 redundantly 4 times. This is to overcome any possible noise present in the store that may interfere with the trigger transmissions. The shopping cart electronics 514 needs to receive only one of the trigger blocks 1803 error free to act (i.e., display a message to the consumer if there is a message with the matching trigger address present in the shopping cart memory 1306). At a point 1604 the microprocessor 1505 has completed its transmission program task and now toggles a bit high and then back to low on an output port 1517. This triggers the power-off timer circuit 1502, which removes power to all of the rest of the transmitter circuitry for the next 5 seconds. The trigger input to the power-off timer is pulled down by a resistor so that while the microprocessor 1505 is powered-down, spurious triggers do not occur. The power-up to power-down duty cycle is approximately 1 percent.

FIG. 12B shows successive power cycles 1600 wherein an error condition 1605 results from the failure of the microprocessor 1505 in which the microprocessor is hung-up and does not re-trigger the power-off timer 1502 after completing its transmissions. This could be due to some transient event (e.g., electrostatic discharge). In this case, the power-off timer 1502 drops power to the rest of the transmitter circuitry after a short time, preferably twice the typical power up time 1603. This resets the microprocessor 1505 at time 1606 and allows the normal power cycle 1600 to resume.

FIG. 13 shows the format of each 8-bit character transmitted and/or received by the Trigger Transmitter 512, the SCD 514, the Polling Transceiver 516, and the Store Message Transceiver 503. Each character is sent in serial asynchronous format. After idle, start bit 1701 is transmitted followed by eight data bits 1702 and one stop bit 1703. The least significant bit 1705 is sent first. This format is common in the computer industry. It is implemented in many Universal Asynchronous Receiver Transmitter (UART) integrated circuits. An example is the 8250 Asynchronous Communication Element manufactured by National Semiconductor Corporation.

FIGS. 14A and 14B show an exemplary trigger transmission format 1800 for a message from a Trigger Transmitter (TT) 512. Most of the time the transmitter 512 is powered down to conserve battery energy. The transmission controller 800 is always powered up and running. As shown in FIG. 14A, after the predetermined off time, for example, 5 seconds, the transmission controller 800 powers up the data modulator and transmitter 801. When the transmitter circuitry is thus powered-up at the end of the power-off timer cycle 1601, the data modulator and transmitter 801 begins transmitting carrier with no modulation during the idle condition 1802. This idle time allows the transmitter circuits and the receiver circuits on the shopping cart 500 to stabilize. Next the trigger block 1803 is transmitted 4 times, followed by a postamble (i.e., idle) 1810.

As shown in FIG. 14B, each trigger block 1803 includes a preamble 1804 followed by a flag character 1805, a length character 1806, a block type character 1807, a combined transmitter address and battery status character 1808, and finally a Cyclic Redundancy Check (CRC) 1809 which is two characters long. As shown in FIG. 13, each character comprises 8 bits 1702 of data, preceded by a start bit 1701 and followed by a stop bit 1703, making 10 bit times to send each character.

The preamble 1804 is three character-times of no modulation. This allows the character watchdog timer that is running in the shopping cart electronics 512 to time out and clear a reception buffer in the cart 500 if a partial trigger block 1803 was received. This clearing occurs before each trigger block during the preamble time 1804. If a shopping cart 500 enters the range of a Trigger Transmitter 512 while the transmitter is in the middle of sending a trigger block 1803, the cart will receive only part of the trigger block. When the preamble 1804 of the next trigger block occurs, the partially received trigger block will be cleared from the receiver and all software values will be re-initialized in anticipation of receiving the data in the current trigger block.

The flag character 1805 is a unique fixed value providing synchronizing that indicates that the next character is the length.

The length character 1806 indicates how many characters are remaining in this block after the length character starting with the block type character 1807 and extending through the last CRC character. The trigger block shown has a length value of 4.

The block type character 1807 indicates what kind of block this is. The Trigger Transmitter 512 sends a block type value of zero to indicate that this is a trigger block.

The next character 1808 is made up of two data fields. The most significant bit is the battery status as received from the battery state detector circuitry 1507. The low order 7 binary bits are the transmitter address as read from the 7 position DIP switch 1508; this identifies the particular Trigger Transmitter 512 and is sent to the carts 500 in the store 107. The trigger transmitter address can be any convenient length as necessary to accommodate the numbers assigned to the respective transmitters.

The two characters that make up the Cyclic Redundancy Check (CRC) 1809 are computed by the transmitter microprocessor 1505 from the values of the preceding characters in the block. The algorithm is CRC-16 which is commonly used in the computer industry. The CRC 1809 is used to detect errors in the transmission of the blocks 1803. The microprocessor 1311 on the cart 500 determines the validity of the data in the block by calculating the CRC from the received data block using the same algorithm as the transmitter microprocessor 1505. It then compares the calculated CRC to the received CRC 1809. If they match the data block 1803 has a very high probability of being correct. If they do not match, the respective block 1803 is ignored.

A short duration of unmodulated carrier 1810 is sent after the fourth trigger block 1803. During this time the microprocessor 1311 on the shopping cart 500 is calculating the CRC on the fourth block 1803 to verify the data in the block. There is a possibility that spurious characters may be received by the cart electronics 514 when the transmitter power is shut off. This idle time 1810 delays the possible reception of these noise characters and the microprocessor 1311 interrupts that they produce.

At the end of the postamble 1810, the transmission controller 800 powers down the data modulator and transmitter 801 and begins timing the off duration again. When the time-out elapses, the whole message sequence 1800 is repeated.

During the Trigger Transmitter idle 1802, the AGC of the cart-based Trigger Receiver and Response Transmitter 1313 stabilizes and the received signal strength is measured against a reference. If the signal strength is below the reference, the rest of the message is ignored. If the signal strength is above the reference, the receiver output is gated on and the cart-based central processing unit (CPU) 1311 is interrupted ("woken up") to begin message reception. The CPU 1311 receives the trigger transmitter address 1808 and the CRC 1809. It then validates the data by calculating the check sum or CRC and comparing it to the received value 1809. If the data are not valid, the CPU 1311 ignores the Trigger Transmitter message. If the data are valid, the CPU 1311 searches its memory 1306 for any message that has the received trigger address 1808 associated with it. If a match is found, the associated message is displayed (FIGS. 9A and 9B) to the consumer who is pushing the cart 500. As explained later, the message displayed may include a component that is dependent upon the trigger signals previously received. If no match is found, no message is displayed.

Regardless of whether or not a match is found, all valid trigger transmissions received by the cart electronics 514 are logged in memory 1306, along with the time and date of reception. This allows the path, speed, direction, etc. of the cart electronics 514 to be tracked by cart-based software. This allows messages to be selectively displayed based on the consumer's path through the store.

During check-out, the information logged in SCD memory 1306 is up loaded to the In-Store Computer 502 and ultimately up loaded over the WAN 105 to the Billing and Control computer 400 in the studio 103. These data can be analyzed to determine how the store aisles are traversed by the consumers, dwell time in each category, overall shopping trip duration, etc.

FIG. 15 is a flow chart of the software that the trigger transmitter single chip microprocessor 1505 executes on power-up by the power switch 1503 upon completion of the off time of the power-off timer 1502 after the reset cycle from the power reset circuit 1506 is complete. The microprocessor 1505 first performs its initialization routine in block 1901 to set the processor operation modes, interrupts, registers, etc. The only variable part of the transmission block is the address and battery status character byte 1808. At block 1902 the microprocessor 1505 reads the 7 bits of transmitter address from the DIP switch 1508 and reads the battery status from the battery state detector 1507. These data are combined into one byte, the high order bit being the battery status and the low order 7 bits the transmitter address. Next at block 1903 the CRC is calculated for the complete trigger transmission block 1803. The program next delays at block 1904 to allow the external transmitter and receiver circuits to stabilize.

The program then enters a loop at blocks 1905-1908 that is executed 4 times. First the loop counter is incremented in block 1905. At block 1906 a three character-time delay is executed. The preamble 1804 with no modulation is transmitted by the data modulator and transmitter 801 during this time. Then at block 1907 the rest of the trigger block 1803 is transmitted. The rest of the block consists of a flag character 1805, a length character 1806, a block type character 1807, a character 1808 that is the transmitter address (7 bits) combined with the battery status as the most significant bit, and finally two characters of Cyclic Redundancy Check (CRC) 1809. The transmission is by toggling a bit on an output port of the microprocessor 1505 coupled to the data modulator and transmitter 801. This is a "software UART" except that the start, data, and stop bits are differentially encoded as they are sent by the microprocessor 1505. This encoding, along with the Phase Shift Keyed (PSK) modulator circuit 1511 and the rest of the data modulator and transmitter 801, produces transmissions that are Differentially Phase Shift Keyed (DPSK).

The loop counter is tested at block 1908. When the 4 loops are complete, the program delays again at block 1909 to cause the data modulator and transmitter 801 to transmit unmodulated carrier postamble 1810. Then a bit on the output port 1517 is toggled at block 1910. This triggers the power-down timer circuit 1502 which removes battery power from all of the transmitter circuitry except the power-down timer itself. In block 1912 the battery power to the CPU 1505 falls until the CPU is disabled in its power-down mode until reinitialized at block 1901 upon the next power pulse 1603. This is to save power of the battery 804.

FIG. 16 illustrates schematically the preferred relative disposition of antennas in the RF trigger embodiment. The Trigger Transmitter antenna coil 1514, is preferably mounted on a shelf edge at the floor of the store 107 or on the floor itself. The receiver antenna coil 2101 is part of the radiator/sensor 1314 of the Shopping Cart Display 512. Each is a coil of wire mounted with its axis vertical. The primary coupling between the two coils is magnetic (H-field). Each coil is made resonant at the frequency of the oscillator 1510, namely, 400 KHz.

All antenna coils 1514 generate both an electric (E) and magnetic (H) field. In the far field (approximately 5 wavelengths away from the antenna) the E and H fields obey a fixed relationship that is independent of the type of antenna. In the far field region, the energy falls off as an inverse function of the distance squared. In the near field (less than 5 wavelengths), the energy falls off as an inverse function of the distance cubed. The presently preferred RF embodiment operates in the near field to take advantage of the inverse cubed rolloff in energy to control the area of desired response zone for a particular Trigger Transmitter 512 relative to that of the zones for nearby Trigger Transmitters 512. In particular, the system employs a small loop antenna coil 1514 which acts like a magnetic dipole to create a large H near field component. A similar magnetic loop antenna coil 2101 mounted within the SCD electronics 514 is employed to receive the signal.

The cart-based receiver responds primarily the magnetic component of the field 513. When a cart receiver antenna coil 2101 is in proximity of a transmitter antenna coil 1514, the coils are magnetically coupled and act as a transformer. The transmitter coil 1514 acts as the primary winding and the receiver coil 2101 acts as the secondary winding. Both coils are oriented with their main axis in the vertical position for more rapid dropoff of the coupling.

It is preferred that the transmitter antenna coils 1514 be vertically displaced from the level in the shopping carts 500 where the receiving antenna coils 2101 are mounted. This provides additional zonal sensitivity, for the coupling between coils falls off more rapidly as the coils are relatively displaced laterally upon movement of the cart 500 through the aisles of the store 107. It is also preferred that there be two coils 2101 on respective sides of the shopping carts 500. This provides different sensitivities to respective coils 1514 on respective sides of the aisle which a cart 500 is traversing. Reception at respective coils 2101 on the same cart may be processed separately to provide better zonal and lateral discrimination between signals from FIG. 7 depicts an ideal aisle zone coverage for Trigger Transmitters 512. The figure is a top view of an aisle 1000 with shelves 1001 on both sides. Two Trigger Transmitters 512 are shown mounted on the left side of the aisle. The resultant "ideal" zone coverage 1003 of the aisle is shown. The zones are perfectly rectangular, of uniform field density, and are adjacent each other with a small guard band 1004.

FIG. 8 is similar to FIG. 7, but depicts a more practically attainable aisle zone coverage. The zones 1005 are not rectangular, not of uniform field density, and leave a wider guard band 1004. Within a zone 1005, the trigger transmissions are strong enough to trigger the display of a message if there is a corresponding message stored in the respective cart 500.

As shown in FIG. 17A, the RF Trigger Receiver and Response Transmitter 1313 in the shopping cart 500 is very similar to the Trigger Transmitter 512 that is located on the shelf edge. In the presently preferred embodiment a UART 2107 comprises a Model No. SCC 2691 manufactured by Signetics Inc. Serial asynchronous data on a line 2113 and 9600 baud data clock on line 2114 are applied from the UART 2107 to a DPSK modulator 2110. The modulator 2110 provides a zero degree or 180 degree phase shift from carrier input to output based on data on the line 2113 and data clock on line 2114. A 400 KHz oscillator 2111 provides unmodulated carrier to the modulator 2110. A CMOS logic inverter 2109 and the two power drivers 2108 (each a power MOS FET) provide current gain and complementary drive to the loop antenna coil 2101 when they are connected to the antenna by an antenna switch 2102. Control of the antenna switch 2102 is by the transmit enable input to the switch 2102 from the power supply 1320 Of the SCD 514. When high, the antenna coil 2101 is attached to the power drivers 2108. The antenna coil 2101 is resonant at 400 KHz. The transmissions radiated by the antenna coil 2101 are 400 KHz DPSK, asynchronous, half-duplex, at 9600 baud. The Trigger Receiver and Response Transmitter 1312 allows the shopping cart electronics 514 to respond to interrogations from the Polling Transceiver 516 during the time the cart is at the check-out station 515.

The Trigger Receiver and Response Transmitter 1313 mounted on the shopping cart 500 picks up trigger transmissions over the communications link 513 from the Trigger Transmitters 512 mounted on the shelves. It also picks up transmissions over a corresponding communications link 513 (bidirections for polling) from the Polling Transceiver 516 mounted at the check-out counter 515 when the cart 500 is in the check-out counter. When the transmit enable input to the antenna switch 2102 is low, RF energy picked up by the antenna coil 2101 is coupled to an amplifier and bandpass filter 2103. The output of the amplifier 2103 is simultaneously coupled to a DPSK demodulator 2104 and carrier threshold detector 2105. The carrier threshold detector 2105 generates an AGC signal which is fed back to control the gain of the amplifier 2103 in a manner well known in the art to prevent overloading of the front end amplifier 2103. When the received signal is above a threshold level signifying a Transmitter Trigger 512 within the discrimination range (i.e., a receiving antenna coil 2101 is within a zone 1005), the threshold detector 2105 outputs a signal that is coupled to the demodulator 2104 and a logic gate 2106. The DPSK demodulator 2104 contains a Phase Locked Loop (PLL). Only when the PLL is in lock and the signal from the threshold detector 2105 is present does the demodulator 2104 apply a received data (RXD) signal over a line 2115 to the UART 2107. The gate 2106 applies a Data Carrier Detect (DCD) signal over a line 2116 to the UART 2107 only when the carrier level as measured by the threshold detector 2105 is adequate and the PLL in the demodulator 2104 is in a locked condition. The UART 2107 contains an on-chip Baud Rate Generator to control the data clock on line 2114, the data transmit rate on line 2113 and the receive data rate on line 2115. Because the data are transmitted without embedded clock (asynchronously) the clock rates are set at the respective communicating units to operate at the same rate, 9600 baud in this preferred embodiment. Clock rate is controlled by a crystal 2112. The UART 2107 provides data on a data bus 2119 and, status and interrupts on a control bus 2120 through a Trigger Receiver Transmitter Interface 1312 to the microprocessor bus 1310 and thence to the microprocessor CPU 1311.

Power utilization of the Trigger Receiver and Response Transmitter 1313 is minimized by powering up only necessary sections of the circuit (i.e., the receiver section on a power line 2117 or the transmitter section on a power line 2118) and by controlling the power down mode resident in the UART 2107 under the control of signals applied over the data bu, 2119 and the control bus 2120 from the microprocessor CPU 1311 in accordance with the well known specifications of the UART 2107. This is to maximize battery life in the shopping cart electronics 514.

FIG. 17B shows the infrared (IR) embodiment of the Trigger Receiver and Response Transmitter 1313 and 1314 in detail. Functional blocks that have the same reference number operate in a similar manner as described for FIG. 17A. In this embodiment, a demodulator 2204 and a modulator 2210 handle Pulse Amplitude Modulation (PAM) for the same purposes as the corresponding parts in the RF embodiment. The asynchronous data rate of lines 2115 (RXD not) and 2113 (TXD not) is 1200 baud. The frequency of the carrier oscillator 2211 is 38.4 KHz. The power driver 2208 receives switched power 2118 from power supply 1320. The power driver provides current gain to drive the infrared emitter 2122 (part of the Radiator/Sensor 1314). The infrared emitter is one or more infrared (IR) Light Emitting Diodes (LEDs), physically oriented on the cart 500 to transmit over the communications link 513 to the Polling Transceiver 516. The infrared detector 2121 (also part of the Radiator/Sensor 1314) is one or more photodiodes physically oriented on the cart 500 to receive transmissions over the communications link 513 from the Trigger Transmitters 512 and Polling Transceivers 516.

FIG. 18A shows the RF embodiment of the Polling Transceiver (PT) 516, which is mounted at the check-out lane. As shown in FIG. 4, the Polling Transceiver forwards queries from the In-Store Computer (ISC) 502 to the electronics 514 mounted on the shopping cart 500. The cart 500 sends responses which the Polling Transceiver 516. returns to the ISC 502. The communications link 517 connection between the ISC 502 and the PT 516 preferably comprises a Local Area Network (LAN) including an RS-422 multidrop asynchronous hardwired link operating at a rate of 9600 baud. Each PT 516 has a unique address on the LAN which corresponds with the check-out lane number. The link between the PT 516 and the shopping cart based electronics 514 is 400 KHz Differentially Phase Shift Keyed (DPSK) Radio Frequency (RF), asynchronous, half duplex, at a rate of 9600 baud. All links use a byte count protocol.

The Polling Transceiver 516 is in one preferred embodiment very similar to the previously described Trigger Receiver and Response Transmitter 1313 shown in FIG. 17A, except for the following. A microprocessor 2207 is a single chip microprocessor (Intel Corporation 87C51) instead of the UART 2107. The demodulator 2104 provides a signal DCD1 signifying phase lock directly to the microprocessor 2207. The threshold detector 2105 provides a signal DCD2 indicating adequate signal level directly to the microprocessor 2207. The microprocessor 2207 performs the logical AND of these two signals internally rather than using the external gate 2106 to produce the Data Carrier Detect (DCD) signal. The microprocessor 2207 directly controls the state of the antenna switch 2102 by signal "Request To Send not" (RTS not) over a line 2218. Serial data are sent on a line 2219 from the microprocessor 2207 to a modulator 2140 which is differentially encoded by the "software UART" (previously described in the Trigger Transmitter 512). The modulator 2210 is a PSK modulator and does not require a data clock on the line 2114 as in the Trigger Receiver and Response Transmitter 1313.

The Polling Transceiver 516 has additional circuitry. A power supply 2212 converts 120 volt alternating current to direct current to supply all of the circuits. Data memory 2213 provides a buffer for messages received from the ISC 502 via the LAN 517 which are to be forwarded to the shopping cart 500 and vice versa. A crystal 2112 controls the clock signal to the microprocessor 2207. A reset circuit 2215 responsive to the output of the power supply 2212 acts like the reset circuit 1506 to hold the microprocessor 2207 in a reset state during power-up until the power supply voltages and microprocessor clock are stable.

The ISC 502 originates a Local Area Network (LAN) 517 which is connected to all of the Polling Transceiver 516 units in the store 107. The interface to the LAN 517 is via a driver 2216, a receiver 2217 and the serial interface (RXD and TXD) of the microprocessor 2207. The link is RS-422 multidrop. The LAN address of each specific Polling Transceiver is put into the EPROM of the respective single chip microprocessor 2207 at time of manufacture. The driver 2216 is controlled by an enabling signal from the microprocessor 2207 provided when the particular Polling Transceiver 516 is polled by a polling signal received by the receiver 2217 from the In-Store Computer 502.

FIG. 18B shows the infrared (IR) embodiment of the Polling Transceiver 516. Functional blocks that have the same reference number operate in a similar manner as described for FIGS. 11A, 11B, 17A, 17B and 18A. The infrared detector 2220 and infrared emitter 2221 are physically oriented to receive and transmit transmissions 1315 to the radiator/sensor 1314 mounted on the cart 500 while it is in the vicinity to the check-out station 515. The link between the Polling Transceiver 516 and the shopping cart based electronics 514 is 38.4 KHz pulse amplitude modulated (PAM) infrared, half duplex, at a data rate of 1200 baud, asynchronously.

FIG. 19 shows the format of a transmission block sent by a Polling Transceiver 516. The Polling Transceiver (PT) 516 can send four types of commands to the shopping cart 500. They are $\phi 1$ poll, $\phi 2$ log dump, $\phi 3$ log clear, and $\phi 4$ power down. The value of a block type character 2304 determines what the command is. The format of the commands is similar to that of the trigger blocks 1803 transmitted by the Trigger Transmitter 512. The protocol is a byte count type. Each character of the transmission block is sent asynchronously using the character format 1700 shown in FIG. 13, one start bit 1701, eight data bits (least significant bit first) 1702, and one stop bit 1703. A command includes a preamble (30 bit-times of idle state like the preamble 1804 of the trigger blocks 1803) a flag character 2302, a length character 2303, a block type character 2304, a Polling Transceiver address character 2305, two characters of Cyclic Redundancy Check (CRC) 2306, and a postamble 2307 (30 bit-times of idle state like the preamble 2301). The flag 2302 is a fixed eight bit value providing synchronization. The length character 2303 indicates how many characters follow in the block starting with the block type character 2304 through the last CRC character 2306, namely, four.

The block type character 2304 has four possible values. A value of one ($\phi 1$) indicates that this is a poll request (command) to the shopping cart display electronics 514. The cart 500 will respond with a status response block 2403 as shown in FIG. 20. A value of two ($\phi 2$) indicates that this is a log dump request (command) to the shopping cart 500. The cart electronics will respond with a log dump response block 2503 as shown in FIG. 21. A value of three ($\phi 3$) indicates that this is a log clear request (command) to the shopping cart electronics. The cart 500 will respond with a log clear response block 2603 as shown in FIG. 22. A value of four ($\phi 4$) indicates a power down request (command) to the shopping cart 500. The cart 500 will then power down. The response blocks 2403, 2405, and 2603 (FIGS. 20, 21, and 22) use a byte count protocol that is similar to that of the Trigger Transmitter 512 except that the length field of blocks 2403, 2503, 2603 are two characters (sixteen bits) long. The Transceiver Address character 2305 identifies the respective check-out station 515. The CRC characters provide a check on the accuracy of signal transmission so that erroneous transmissions may be ignored (or corrected if a correction encoding scheme is used).

The poll response block 2403 (FIG. 20) is a response to a poll request asking what cart 500 is at the particular check-out station. The poll response block 2403 includes the following components in succession, with characters of format 1700 (FIG. 13):

Preamble—30 bit-times of idle state to permit standardization.

Flag—1 character for synchronization.

Length—the number of characters following, namely 6.

Block Type—1 character 81 indicating the block to be a status response block 2403.

Requestor Address—1 character providing the address of the requesting transceiver 516 that initiated the poll request $\phi 1$.

Cart Address and Battery Status—2 character wherein the high order bit identifies the status of the battery of responding cart 500 and the 15 lower order bits identify the particular cart 500.

CRC—two characters like CRC 2306 (FIG. 19).

Postamble—30 bit-times of idle for processing the response.

The log dump response block 2503 (FIG. 21) is a response to a log dump request requesting the cart 500 at the respective check-out stand 515 to transmit its data log, that is, the information it has stored in making its rounds of the store 107. As shown, each log dump response block 2503 has the same format as a poll response 2403 except that: the length character will be different to identify the variable number of characters to follow in the block, and the block type character is 82 to indicate the block to be a response to an φ2 log dump request. A variable number of characters for dump of cart data log are transmitted after the cart address and battery status character to provide the data requested by the Polling Transceiver 516.

The clear log response block 2603 (FIG. 22) is a response to a clear log request commanding the cart 500 at the respective check-out counter to clear its respective data log. The clear log response block 2603 indicates that the message was received and the log data was cleared. The clear log response block 2603 has the same format as a poll response block 2403; however, the block type is 83 indicating the block 2603 to be a response to a φ3 clear log request.

FIG. 9A shows one presently preferred embodiment of the shopping cart 500 display mounted on the shopping cart 500. The back of the display electronics 514 rests on the conventional cart handle (not shown). A new handle 1201 is attached in front of the display. The display comprises a super-twist or hyper-twist liquid crystal display (LCD) for low power consumption and high contrast. Its resolution is 640 picture-elements (pixels) across by 200 pixels high. The display is overlaid with a transparent touch-sensitive keyboard 901. This provides for a very flexible keyboard configuration because the key legends written on the FIG. 9A shows an embodiment of the shipping cart display 514 in which the keyboard 901 is a transparent overlay which is put on top of a liquid crystal display. Each touch sensitive area may be approximately one inch square with a guard band around each. Legends for the area are applied by the software and microprocessor 1311 writing text characters on the display. The customer selects an interaction by pressing on the screen over the applicable legend to produce the action he desires.

FIG. 9B shows an alternative embodiment of the screen and keyboard. In this embodiment keys 1203 are discrete and located along the left and right edge of the display area 1205. The legends 1207 for the keys are written on the display by the software and microprocessor 1311 at appropriate times.

FIG. 9B shows a "menu," which is a selection of possible customer interactions with the shipping cart display. For example, if the key adjacent to Product Location is pressed, a list of product names and their aisle location designators will appear. The customer may push the button adjacent to Store Map to pull up on the display area 1205 a map of the store aisles.

The In-Store Computer 502 and all of the shipping cart displays 514 are connected together in a Radio-based Local Area Network (LAN) by the Store Message Transceiver 503, the VHF receiver 1313 (part of each shipping cart display 514), the software operating on the In-Stop Computer 502 and the software operating on the microprocessor 1311.

If the consumer presses the button adjacent to the Recipes label, an interactive cookbook is displayed. The consumer can query multiple recipes, recipes that have a particular ingredient in them, recipes of a particular ethnic cuisine, etc. The data base for the cookbook resides on the storage devices of the In-Store Computer 502. The shipping cart display electronics 514 makes data requests via the radio-based LAN and receives data (display screens) in response. In this mode the shipping cart display electronics is operating in a mode similar to a computer terminal attached to the In-Store Computer 502.

As shown in FIG. 9B, one of the keyboard button labels is Deli Number. By pressing this button, the customer requests that a deli queue number be assigned to him. This is equivalent to going to the deli and tearing off a paper tag to enter the deli queue. When this request is made, the shopping cart display electronics 514 queries the In-Store Computer 502 via the radio-based LAN. The In-Store Computer 502 in turn queries the known number assignment equipment in the deli via the communications link 508 to local store data and receives a number assignment. The In-Store Computer 502 also queries the deli number assignment equipment to find the deli number that is currently being served. These two pieces of data are returned to the requesting shopping cart display electronics 514 for display to the customer.

In the same way that the deli number can be ordered from the deli department, the consumer can order other items from other departments in the store via the shopping cart display system. For example, videotape titles can be selected and ordered for later pick up at the video department, and custom butcher orders can be placed for later pick up at the butcher shop.

One embodiment of the shopping cart display has a bar code scanner attached to the cart electronics 514. By scanning the UPC or EAN of a product, or entering this data via the keyboard, the customer is able to keep a running total of the monetary value of the products that he has put into his cart. When a product code is entered into the SCD electronics 514, a look-up request for the pries of the product is forwarded to the In-Store Computer 502 via the radio-based LAN. The In-Store Computer 502 queries the in-store scanning system via the communications link 509. The price data are returned to the requesting SCD electronics 514 via the same paths. The SCD electronics 514 adds this new price into the existing running total.

FIG. 10 is a block diagram of the SCD cart-based electronics 514. The man-machine interface is provided by the display 1301, input section 1303 and audio speaker 1308. The liquid crystal display (LCD) 1301 is preferably a super-twist type for high contrast and wide viewing angle. The display is a multiplexed type that requires a refresh controller 1302 connected to the CPU 1311 via the system bus 1310. The input section 1303 may be any or all of a number of input devices, notably a keyboard 901, a bar code reader and/or a smart card reader. As shown in FIG. 9 the keyboard 901 is a clear overlay on the LCD. A bus interface 1304 provides an interrupt per character to the central processing unit (CPU) 1311. This allows the CPU 1311 to go into low power mode whenever it is idle in order to conserve battery life. The interrupt will bring the CPU 1311 out of low power mode when required. The interface 1304 can produce CPU reset to the CPU 1311 for a character, when conditioned by software. An audio output circuit 1309 provides signals to a speaker 1308 to produce an output of various pitches and crude speech. Additionally output may be by way of a printer 1327 and/or a scent dispenser 1328.

A Read only Memory (ROM) subsystem 1305 provides storage and retrieval of fixed program and data segments for the CPU 1311. Data are loaded into the ROM 1305 at time of system manufacture. An example of fixed data is the unique serial number (address) which is loaded into each cart 500 during manufacture.

A static Random Access Memory (RAM) 1306 with nonvolatile power provides dynamically changeable storage and retrieval of program and data segments for the CPU 1311. Program and data segments can be down loaded via the Store Message Transceiver 1317 and transceiver interface 1316 from the In-Store Computer 502. This allows rapid update of software in the cart 500, A nonvolatile clock and calendar 1307 provides date, time of day, and clock interrupts to the CPU 1311. The clock circuitry 1307 can produce CPU reset to the CPU 1311 when an "alarm" date and time is reached.

The Central Processing Unit (CPU) 1311 provides overall system control and program execution. It is a low power Complementary Metal Oxide Semiconductor (CMOS) microprocessor.

The trigger transceiver subassembly consists of the radiator/sensor 1314, the trigger receiver and transmitter 1313, and the trigger receiver and transmitter interface 1312 with the bus 1310. For the RF embodiment, the radiator/sensor 1314 comprises an antenna coil 2101 optimized for reception of low-frequency magnetic (H-field) transmissions 513 from trigger transmitters 512. As described above in connection with FIG. 17A, the trigger receiver and transmitter 1313 has a fast acting Automatic Gain Control (AGC) circuit with signal amplitude discrimination. Only signal amplitudes above a set reference enable the output of the receiver circuitry and cause an interrupt to the CPU 1311. The IR embodiment of the radiator/sensor 1314 and Trigger Receiver and Response Transmitter 1313 is shown in FIG. 17B as described above. The Trigger Receiver could alternatively be implemented as a microwave, or ultrasonic receiver in correspondence with the Trigger Transmitter 512 and the Polling Transceiver 516.

A return transmit path is also provided by the interface 1312, trigger receiver and response transmitter 1313 and the radiator/sensor 1314 as described above in connection with FIGS. 18A and 18B. This allows low duty cycle return transmission from the cart 500 to the In-Store Computer 502 via a Polling Transceiver 516 at check out.

Bidirectional communication with the store message transceiver 503 over the communications link 504 is by way of a VHF message transceiver 1317 and a transceiver to bus interface 1316. Only received signal amplitudes above a set reference level enable the output of the circuitry and cause an interrupt to the CPU 1311.

A power supply 1320 provides power, power control, battery recharge control, and power supply status to the cart-based electronics 514 to minimize power dissipation and maximize battery life. A lithium primary battery 1321 provides nonvolatile power to the Static RAM 1306 and the clock and calendar 1307. A rechargeable battery 1322 is the main power source for all of the SCD cart-based electronics 514. The current status (discharged or charged) of these batteries can be reported to the CPU 1311 via the power supply interface 1319. This status is returned by the trigger receiver and response transmitter 1313 to the ISC 502 via the polling transceiver 516 during check-out. Alternatively, communication can be effected over the radio link 504 between the SCD Message Transceiver 1317 and the Store Message Transceiver 503. Store personnel can be alerted to replace discharged battery packs.

The power supply 1320 can also turn power on and off to various subsystems on the cart 500, under control of the CPU 1311. Power can be independently controlled to the display 1301 and interface 1302, the audio speaker 1308 and audio output circuit 1309, the trigger receiver and response transmitter 1313, the interface 1312 and the radiator/sensor 1314, and the message transceiver 1317 and interface 1316.

The power supply also monitors and reports the status of a cart notion (shake) sensor and handle touch sensor 1323 and provides an interrupt to the CPU 1311 upon detection of notion. The motion sensor might be combined in a wheel generator 1326 if a generator is used to supply power to the cart system electronics 514. If the cart has not moved in a relatively long time, the CPU turns off power to all of the subsystems that it can and puts itself into its power down mode.

Power may alternatively or additionally be supplied via an inductive or contact power pick-up 1324 or a photovoltaic battery source 1326.

The cart motion/handle touch sensor 1323 is used to determine if a consumer was at the cart when a particular ad was displayed. This data on ad delivery is returned during check-out to the ISC 502 and to the studio 103. These data are similar to the electronic diaries ("People Meters") used in the television ratings business.

One of the input devices 1303 is a smart card reader. A smart card is a plastic card approximately the size of a credit card. Embedded in the plastic card is a microprocessor and nonvolatile memory. The purpose of the card is to store a personal data base for a customer. The data base can contain the customer's demographic information, social security identification number, health records, bank account balances (debit card), participation in a loyal-shoppers program, participation in an airline frequent flier program, etc. The shopping cart display is able to read and write this data base. This allows, for example, the system to dispense (print) a coupon for dog food if the customer's demographic information indicated that he owned a dog, or target different advertisements to this cart based on the demographic information, or award loyal shopper points if the customer purchases certain manufacturers products.

DESCRIPTION OF SHOPPING-CART-BASED SOFTWARE PROGRAM

The Shopping Cart Display (SCD) software program consists of foreground and background tasks. The foreground tasks consists of initialization, idle loop, and display execution detailed in FIGS. 23 through 25B. There are two background (interrupt driven) tasks executing. The first task is Message Refresh. It is detailed in FIGS. 26A through 35C. The second task operating is the Trigger reception task. Trigger reception is detailed in FIGS. 36A through 39.

FOREGROUND TASK (MAIN LOOP)

FIG. 23 shows the main loop of the foreground tasks of the CPU 1311. The program is entered at block 2701 when the microprocessor 1311 has completed a hardware reset upon power on. Reset occurs for several reasons. It occurs upon power up after an unexpected power down (i.e., complete battery failure). Microprocessor hardware reset also occurs as a result of some peripheral device action. At block 2703 the warm boot flag is tested. If the flag is not set, then this reset occurred unexpectedly (e.g., as a part of power up upon installation of new batteries). Consequently, the diagnostic programs are executed at 2705 with the results displayed on the liquid crystal display. Next, the cold boot initialization routine is executed at 2707 to initialize system variables and memory.

If the warm boot flag was set, it indicates that the latest reset was a CPU reset anticipated by the software. Such resets can occur from the motion sensor, handle sensor, clock or keyboard after their interface circuitry has been conditioned by software to output the hardware reset signal instead of an interrupt signal. If after CPU reset as determined in the block 2703, a test is made at block 2709 for a keyboard request. If a keyboard request is pending, then at block 2711 the character is taken from the interface circuit and loaded into the keyboard buffer. Following completion of the step at one of blocks 2707 or 2711 or upon a negative result of the test in block 2709, the warm boot flag is cleared at block 2713, and a warm boot initialization routine is executed at block 2715. Next, at block 2717, the external interfaces which could cause CPU resets (e.g., the interfaces to the motion sensor, handle sensor, the clock and the keyboard), are initialized so as to generate interrupts, not CPU reset. Next the software powers up the Trigger and Message Refresh receivers at block 2719 and loads and starts an activity watchdog timer at block 2721. This watchdog timer is reinitialized and loaded by any activity (keystrokes, cart notion, handle touch). When the watchdog timer times out, for example after 15 minutes of inactivity, the cart will power down to conserve battery life on the assumption that the cart is no longer in use.

With the preliminaries completed, the program enters an idle loop 2733. At block 2735 the microprocessor 1311 is put into a low-power halt mode. In this mode, the CPU clock is still running, but CPU execution is halted at the instruction that put the CPU into the low-power halt mode, and interrupts are still active. In this mode CPU power consumption is significantly reduced. After an interrupt occurs and the return from the interrupt service routine is executed, the CPU begins execution at the instruction following the instruction that caused the CPU to enter the low-power halt mode. The Hitachi 64180 and the Intel 80C31 examples of CMOS micro-processors with this low-power halt mode.

At block 2735 the CPU waits in this low-power mode for the next interrupt to occur. At the termination of an interrupt service routine, the next instruction after block 2735 is executed. First the display state machine activity is tested at block 2737 (i.e., is a message being actively displayed now?). If the state machine is active, control is given to the DISPLAY software subroutine at block 2739 (FIG. 24A). When the DISPLAY subroutine is done executing, the program returns to block 2735 (to enter low-power mode again). If the display state machine is not active, then at block 2741 the program tests for any pending display requests from the Trigger Receiver; upon a positive result, the TSTART subroutine is called at block 2743 (FIG. 24B). At the termination of the TSTART subroutine, the low-power mode is re-entered at block 2735. Next at block 2745, if the responses to the tests in block 2737 and 2741 are negative, a test is made for any pending display request from an immediate message delivered to the shopping cart via the Message Refresh radio link. If any requests are pending, the MSTART subroutine is called in block 2747 (FIG. 24C). Upon completion of the MSTART Subroutine, the low power mode is re-entered at block 2735. If the responses to the tests in blocks 2737, 2741 and 2745 are negative, at block 2749 a test is made for any pending keyboard requests (information requests, game requests, calculator mode). If the response to the test is positive, the KSTART subroutine is called in block 2751 (FIG. 24D). At the termination of the KSTART subroutine, the low-power mode is re-entered in block 2735. If none of the 4 previous requests are pending, low-power mode is re-entered in block 2735 to conserve battery power while waiting for the next interrupt.

The DISPLAY subroutine is shown in FIG. 24A. Its purpose is to execute the display state machine. Each message to be displayed has a control structure and data areas that contain image and audio. The control areas define a "script" which governs how the image and audio are displayed on the screen. The script structure is similar to that available in a commercial program called SHOW PARTNER by Brightbill-Roberts and Company, Ltd. This is a slide show program with a script associated with it to control transitions between slides. The script structure is quite flexible, in that it can branch between image segments based on keyboard input, time, or other external program inputs (i.e., current trigger address or log of previous trigger receptions). It is a complete application language for controlling display of images and audio. The DISPLAY subroutine is entered at block 2801. At block 2803, the state machine at 2803 executes this script control structure. At block 2805, the DISPLAY subroutine returns to the point where it was called.

The TSTART subroutine is shown in FIG. 24B. The subroutine is entered at block 2807 as a result of a Trigger block's being received. In block 2809, the subroutine first gets the message address or number that it is to display. Then in block 2811, it loads and initializes the state machine with the information from the control structure of the requested message. Next, in block 2813 it calls the DISPLAY subroutine to execute the script. Finally, at block 2815, the TSTART subroutine returns to the point where it was called.

The MSTART subroutine is shown in FIG. 24C. The subroutine is entered at block 2817 as a result of reception of an Immediate Type 1 or Immediate Type 2 message over the Message Refresh radio link. The header associated with the message is retrieved by the MSTART subroutine at block 2819 to determine whether the message was an immediate 1 or immediate 2 type. Next at block 2821 the state machine is loaded with the control information (script) from the requested message. The DISPLAY subroutine is then entered at block 2803 to execute the script. Finally, at block 2825, the MSTART subroutine returns to the point where it was called.

The KSTART subroutine is shown in FIG. 24D. The subroutine is entered at block 2827 upon request from the consumer via the keyboard for information, games or calculator mode. Much like the previous TSTART and MSTART subroutines, the KSTART subroutine at block 2829 initializes the state machine with the control information from the keyboard message. Next, at block 2831, it begins execution of the state machine by calling the DISPLAY subroutine. Then, at block 2833, KSTART returns to the point where it was called.

FIGS. 25A and 25B show the interrupt subroutines associated with the main loop (FIG. 23). A motion sensor interrupt is entered at block 2901 and/or a handle sensor interrupt is entered at block 2902. In either event, at block 2909, the program loads and restarts the activity watchdog timer. A keyboard interrupt is entered at block 2905. This also loads and restarts the activity watchdog timer at block 2909, but first at block 2907 the keystroke data are saved in the keyboard buffer. If a long period elapses with no motion or handle touch or keystroke, the activity watchdog timer will count down to zero and generate an interrupt entered at block 2913 (FIG. 25B). The software program executes a power-down command by branching to the INACT subroutine at block 2915 (FIG. 35C). This is to conserve battery power. A return-from-interrupt is executed at block 2911.

MESSAGE REFRESH TASK

One of the background (interrupt driven) tasks that executes in the Shopping Cart Display (SCD) electronics 514 is the Message Refresh task. As explained above in connection with FIGS. 5, 26A and 26B, the data frames 3001 that it receives from the Store Message Transceiver 503 are shown in FIGS. 26A and 26B. As explained in connection with FIG. 26B each frame 3001 consists of a header block 3003 followed by a variable number of subsequent data blocks 3005. The main purpose of the Message Refresh task in the cart program is to receive, validate and conditionally load the header and data blocks from the Store Message Transceiver 503 into memory. The data on this link are in a byte-count protocol, consisting of a preamble, a flag character, a length field (2 characters), a block type character, a variable length data field, followed by a 2 character Cyclic Redundancy Check (CRC) field, as described above in connection with FIG. 28.

FIG. 27 indicates the types of data blocks that can be received over the Message Refresh radio link 504. The format for header blocks 3003 was described above in connection with FIG. 28. If the block type is hexadecimal φφ, this block is a message header. This indicates the subsequent blocks are to have a block type of hexadecimal φ8; that is, they are message data blocks. From the information present in the message header, the software is able to decide if it already has this message and version stored in local memory. If it already has this message and version number, it ignores the subsequent blocks and waits for the next header or command. In a similar manner, header block 3003 may show the block type to be an immediate one message header φ1, an immediate two message header φ2 or a code segment header φ3 to indicate what type of subsequent data blocks are to be expected after each one.

FIG. 29 shows the format of a subsequent message block 3005, 3007. It has substantially the same format as the header block 3003 except for an additional field of variable length that includes the active message, that is, the control information and data, wherein the data are trigger information and compressed video and audio or program segments, all encoded in a well known manner. Each message block 3005, 3007, includes a preamble 3301, a flag character 3303, a length field 3305 (2 characters), a block type character 3307, a message number and version number field 3309 (2 characters), a number of subsequent message blocks field 3311 (2 characters), followed by the variable length data field 3313 and a two character CRC field 3315. Block type values 3307 of hexadecimal φ8, φ9 or φA indicate that the data field 3313 is part of a message. The data field 3313 is compressed video and audio along with trigger information and a display control structure (state machine variables or script). If the block type value 3307 is hexadecimal φB, the data field 3313 is a program segment that is to be loaded into memory.

In addition to headers and data blocks, the Message Refresh radio link 504 can deliver commands to the SCD electronics 514. The format of a clock set command is shown in FIG. 30. In conformance with the byte-count protocol, the command contains a preamble 3401, a flag character 3403, a length field 3405 (2 characters), a block type character 3407, followed by a data field 3409 that contains clock set parameters and a CRC 3411 (2 characters). The preamble 3401, flag 3403, length 3405, block type 3407 and the CRC 3411 are comparable in content, format and function to the similar parts of the blocks shown in FIGS. 28 and 29.

In the clock set command the block type value 3407 is hexadecimal 1φ. When the SCD electronics 514 receives this command, it initializes its time of day clock to the time and date values in the data field 3409.

A second command that can be received over the Message Refresh radio link 504 is the power down command. It has a similar format to that of the clock set command shown in FIG. 30. The format of a power down command is shown in FIG. 31 wherein the preamble 3501, flag 3503, length 3505, block type 3407 and the CRC 3411 are comparable in content format and function to the similar parts of the block shown in FIG. 30. The block type 3507 is hexadecimal 11. An optional data field 3509 contains a power-up date and time. If the field 3509 is present and contains data within a legal range, the SCD time of day clock alarm is initialized with the values from the data field 3509. The shopping cart electronics 514 then goes into a power down mode to conserve battery power and optionally powers up at the alarm time.

The Message Refresh reception software program is detailed in FIGS. 32A through 35C. This routine is entered at block 3601 upon reception of a message receiver interrupt. At block 3603, the routine first checks to see that there are no errors detected by the receiver circuitry. If errors are present, the error exit ME subroutine is entered at block 3605 (FIG. 35B). If no errors are present, the MR character reception watchdog timer is reloaded with its initial count value and enabled to begin countdown at block 3607. This timer is continuously reloaded on reception of each character from the Message Refresh radio link 504. If a gap in characters longer than the time value of the Message Refresh character reception watchdog timer occurs (approximately 2.5 character times at the link rate of 9600 baud), the timer generates an interrupt at block 3630 (FIG. 32B) and enters the ME error exit subroutine at block 3605. This guarantees that if a partial block is received, the preamble (3 character times) of the next block causes a Message Refresh character watchdog timer interrupt which clears out the partially received block and reinitializes the software to receive the next block correctly.

After the timer is loaded with its initial value, the received character is read from the receiver circuitry at block 3609. Depending on the state variable MCRS (Message-Refresh Character Reception state) a series of routines are executed. These routines comprise a state machine for reception of data blocks in the format depicted in FIGS. 26 through 31. If the state is φ (MCRS=φ) as tested at block 3611, the message refresh idle, awaiting flag byte (MIDL) subroutine is entered at block 3613 (FIG. 32C). The subroutine MIDL first checks to see if the received byte equals the flag value at block 3637. If not, it discards the character and does a Return From Interrupt (RET I) at block 3641. If the received byte is equal to the flag value, then the Message-Refresh Character Reception State (MCRS) is advanced to Active Awaiting Length Byte High (MCRS=1) at block 3639 and a Return From Interrupt (RET I) is executed at block 3641.

On receipt of the next Message Refresh character interrupt, the response to the test at block 3611 will be negative and the Message-Refresh Active Awaiting Length Byte High (MAALH) subroutine is chosen at block 3615 and is entered at block 3617 (FIG. 32D). This subroutine loads the received byte into the Message-Refresh Byte Count (MBC) high byte at block 3645. Next, at block 3648, it advances the Message-Refresh Character Reception State (MCRS) to Active Awaiting Length Byte Low (MCRS=2). It then executes a Return From Interrupt (RET I) at block 3650.

On receipt of the next Message Refresh character interrupt, the responses to the tests at blocks 3611 and 3615 will be negative and the Message-Refresh Active, Awaiting Length Byte Low (MAALL) routine is chosen at block 3619 and is entered at block 3621 (FIG. 32E). This subroutine loads the received byte into the Message--Refresh Byte Count (MBC) low byte at block 3657. It then advances the Message-Refresh Character Reception State (MCRS) to Active Receiving Block (MCRS=3) at block 3659 and executes a Return from Interrupt (RET I) at block 3661.

Upon subsequent Message Refresh character interrupts the responses to the tests at blocks 3611, 3617 and 3621 will be negative and the Message-Refresh Active Receiving Block (MARB) is chosen at block 3623 and entered at block 3625 (FIG. 33). Upon entry, this routine loads the received byte into the next location in the MR Block Reception Buffer at block 3701. Next, at block 3703, the MR Byte Count (MBC, a 16 bit value) is decremented. If the MBC is not $\phi$ at block 3705, more characters are to be received in this block, and therefore, a Return from Interrupt (RET I) is executed at block 3707. If the MBC is equal to $\phi$ at block 3705, all of the characters for this block have been received. The routine next calculates the CRC on the received block at block 3709 and compares this to the CRC that was received in the message block at block 3711. If they do not match at block 3713, the ME Error Exit is entered at block 3605 (FIG. 35B). If the two CRC's match at block 3713, then it is highly probable that the block has been received correctly. The routine next disables the Message Refresh character reception watchdog timer at block 3715 and tests the block type field as received in the data block successively blocks at 3717, 3721, 3725, and 3729.

If the block type is found in block 3717 to be hexadecimal $\phi$, $\phi1$, $\phi2$ or $\phi3$, the Message Header (MH) subroutine is entered at block 3719 (FIG. 34A). If the block type is found in block 3721 to 6 hexadecimal $\phi8$, $\phi9$, $\phi A$ or $\phi B$, then the Message Block (MB) subroutine is entered at block 3723 (FIG. 34D). If the block type is found in block 3729 to be hexadecimal $1\phi$, then the Set Clock Command (SCC) subroutine is entered at block 3727 (FIG. 35A). If the block type is found in block 3729 to be hexadecimal 11, then the Power Down command (PDC) subroutine is entered at block 3731 (FIG. 35C). If the block type value does not fall into any of the previous four categories, then the ME Error Exit routine is entered at 3605 (FIG. 35B).

The Message Header (MH) subroutine (FIG. 34A) in block 3801 compares the message number and version number from the received header block to those message numbers and version numbers currently in message memory. If a matching message and version is found at block 3803, the software does not need to interpret the subsequent data blocks which will be transmitted on the Message Refresh radio link 504. At block 3805 the routine will calculate when it expects the next header block to be received based on the baud rate of the Message Refresh radio link 504 and the value of the Subsequent Message Block (SMB) field from the recently received header block, and will then subtract a small value (e.g., 10 percent) from this and load this value into the Message Refresh (MR) Off Timer, and enable the count down thereat to begin. At block 3807 the MR receiver interrupts are disabled and at block 3809 the MR receiver circuits are powered down to conserve battery power. At block 3811 follows a Return from Interrupt (RET I).

At the end of the Message Refresh (MR) Off Timer period, an interrupt is generated. The interrupt routine is entered in block 3825 (FIG. 34C), powers up the MR receiver circuits at block 3827 and enters an Error Exit ME routine at 3605 to reinitialize all variables. This will allow the state machine to begin reception of the next data block in anticipation of receiving the next header block.

If the message number and version number from the received header block is not found in message memory at block 3803, the Message Refresh State (MRS) is set to active (MRS=1) at block 3813. Next, the Subsequent Message Block (SMB) field, is-read into the SMB variable in memory at block 3815. The Message Refresh block reception watchdog timer is loaded with its initial value and enabled to begin countdown at block 3817. If a subsequent message block is not received within the watchdog timer period, an interrupt is generated. The interrupt routine is entered at block 3823 (FIG. 34B) and enters an Error Exit ME routine at block 3605 to reinitialize the state machine variables. At block 3819 the received header data are saved in memory in a header save area. Next, at block 3821, the MX message exit routine is entered (FIG. 35B).

Once a message header has been received, the next blocks will be message blocks. This will cause the results of the test at block 3717 to be negative and the result of the test at block 3721 to be positive, resulting in entry into the message block (MB) subroutine at block 3723 (FIG. 34D). The MB subroutine checks the Message Refresh State (MRS) to see that it is active at block 3830. If a message block is received without a previous header being received, this is an error, and the ME error exit routine is entered at block 3605. If a message block is received after a header, the message number and version number of this block is compared with the saved header message and version values at block 3832. If the values do not match at block 3834, this block is to be discarded and the ME Error Exit routine is entered at block 3605. If they do match, the variable SMB (Subsequent Message Block) is decremented at block 3836. This is compared with the received SMB field from the current message block at block 3838. If they do not match, this block is out of sequence and the ME Error Exit is entered at block 3605. If the received SMB matches the SMB in memory, then this data block is correct. The routine next sets the Update In Progress flag on this particular message in memory at block 3840.

Using the control information from this received message block, the data area of the received block is moved to the message memory area at block 3842.

The in-memory SMB variable is tested at block 3844, if it is not equal to zero, then more message blocks are expected for the update on this message and the MX exit routine is entered at block 3821 in anticipation of receiving the following blocks. If the SMB variable is found equal to zero at block 3844, then this is the last message block for this message. The routine clears the Update In Progress flag on this message in memory at block 3846. It next examines the the saved header area in memory at block 3848. If the saved header type is not an immediate 1 or immediate 2 type, then this message refresh is complete and the ME exit routine is entered at block 3605 to clean up variables. If the saved header type is an immediate 1 or immediate 2, then at block 3850 the saved header area is copied into the queue for the foreground display task to retrieve. Next, the ME exit routine is entered at block 3605 to clean up variables.

When the tests at blocks 3717 and 3721 are both negative, at block 3725 the block type is again tested. If the type is 1φ, the Set Clock Command (SCC) is entered at block 3727 (FIG. 35A). In block 3901, this subroutine retrieves the data field from the received block and loads this into the SCD time-of-day clock. It then executes an MX exit subroutine 3821 to clean up variables.

When the tests at blocks 3717, 3721 and 3715 are all negative, the block type is again tested at block 3729. If the type is 11, the Power Down Command (PDC) subroutine is entered at block 3731 (FIG. 35C). At block 3903 the program disables all interrupts and at block 3905 checks the data field of the received command to see if the time and date are within valid ranges. If they are, in block 3907, the subroutine conditions the clock interface circuitry to produce a CPU reset signal upon detection of an alarm condition. Next, at block 3909, the alarm section of the time-of-day clock is loaded with the data from the received block. If the data field of the power down command does not contain valid time values, the routine does not set or condition the alarm section of the time-of-day clock. In either event, the warm boot flag is set at block 3911. This flag indicates to the reset software (FIG. 23) that this CPU reset is expected. The INACT subroutine entered at block 2915, after disabling all interrupts at block 3910, enters the Power Down Command subroutine just before the setting of the warm boot flag at block 3911. Next, at blocks 913, the motion sensor interface handle sensor interface and keyboard interface are conditioned to produce the CPU reset signal, not the interrupt signal. The routine next powers down the receivers, the response transmitter and display at block 3915 to conserve battery power. Next, at block 3917, the program counter return stack is cleaned up by popping-off and discarding the interrupt return address. Finally, this routine at block 3919 sets the microprocessor into its power-down halt mode. In this mode, the only way that the microprocessor will restart is via a hardware reset signal. Since the CPU clock is not running at this time, interrupts are ignored. The microprocessor will stay in this mode until a reset signal is generated by one or more of four events occurring: 1) motion sensed by the motion sensor interface, 2) a handle touch sensed by the handle sensor, 3) a key-press on the keyboard, 4) an alarm condition produced by the time-of-day clock.

The ME exit subroutine (FIG. 35B) sets MRS=φ at block 3921, SMB=φ at block 3923, disables the MR block reception watchdog timer at block 3925, and clears the header save area in memory at 3927. The MX message exit subroutine then joins. In either event the Message Refresh (MR) block reception buffer is cleared at block 3929. The MR Character Reception State is set to idle at block 3931 (MCRS=φ). The MR character reception watchdog timer is disabled at block 3933. The MR receiver circuitry is reinitialized at block 3935, and the MR receiver interrupts are enabled at block 3937. Finally, at block 3939, a Return From Interrupt (RET I) is executed.

When the responses to the tests at blocks 3717, 3721, 3725 and 3729 are all negative, the MARB subroutine (FIG. 33) enters the ME exit subroutine at block 3605. When the responses to the tests at blocks 3611, 3615, 3619, and 3623 are all negative, the Message Refresh Receiver Interrupt subroutine (FIG. 32A) enters the ME exit subroutine at block 3605.

TRIGGER RECEPTION TASK

Another background (interrupt driven) task that is executed in the Shopping Cart Display (SCD) electronics 514 is the Trigger Reception task. The main purpose of this software is to receive, validate and act upon receptions from the Trigger Transmitters 512 and Polling Transceivers 516. These transmissions are in a byte-count protocol detailed in FIGS. 13, 14A, 14B and 19. Optionally, depending on the transmission received, the SCD electronics 514 can return a response to the Polling Transceiver 516 in a format detailed in FIGS. 20, 21, and 22.

The Trigger reception software is detailed in FIGS. 36A through 39. Upon reception of a Trigger Receiver interrupt, the Trigger Receive interrupt routine is entered at block 4001. The routine first checks in block 4003 to see that there are no errors detected by the Trigger Receiver circuitry. If errors are present, the TE error exit routine is entered at block 4005 (FIG. 37B). If no errors are present at block 4007, the Trigger character reception watchdog timer is reloaded with its initial count value and enabled to begin countdown. This timer is continuously reloaded on reception of each character from the Trigger Receiver. If a gap in characters longer than the time value of the Trigger character reception watchdog timer occurs (approximately 2.5 character times at the link rate of 9600 baud), the timer generates an interrupt at block 4130 (FIG. 37C) and enters the TE error exit routine at block 4005. This guarantees that if a partial Trigger block is received, the preamble (3 character times) of the next block will cause a Trigger character watchdog timer interrupt which clears out the partially-received block and reinitializes the software to receive the next Trigger block correctly.

After the timer is loaded with its initial value, the received character is read from the Trigger receiver circuitry at block 4009. Depending on the state variable TCRS (Trigger Character Reception State) a series of routines are executed. Theme routines comprise a state machine for reception of data blocks in the format depicted in FIGS. 14 and 19. If the state is φ (TCRS=φ) at block 4011, the Trigger Idle, awaiting flag byte (TIDL) subroutine is entered at block 4013 (FIG. 36B). The routine TIDL first checks at block 4037 to see if the received byte equals the flag value. If not, at block 4041, it discards the character and does a Return from Interrupt (RET I) at block 4041. If the received byte is equal to the flag value, then at block 4039 the Trigger Character Reception State (TCRS) is advanced to Trigger Active Awaiting Length (TCRS=1) and a Return From Interrupt (RET I) is executed at block 4041.

On receipt of the next Trigger character interrupt the response to the test at block 4013 is negative. TCRS is tested at block 4015. The Trigger Active Awaiting Length (TAAL) subroutine is entered at block 4017 if the response to the test at block 4015 is positive (FIG. 36C). The subroutine TAAL first checks the value of the received byte at block 4029. If the received byte value is 3 or less, it is not a valid length byte and the TE error exit routine is entered at block 4005. If the received byte value is 4 or more, the value is loaded into the Trigger Byte Count (TBC) at block 4031. It next advances the Trigger Character Reception State (TCRS) to Trigger Active Receiving Block (TCRC=2) at block 4033. It then executes a Return From Interrupt (RET I) at block 4035.

Thereafter the responses to the tests at blocks 4011 and 4015 are negative. Subsequent Trigger character interrupts at block 4019 cause the entry of the Trigger Active Receiving Block (TARB) subroutine at block 4021 (FIG. 36D) if TCRS=$\phi$2. Upon entry, this subroutine at block 4043 loads the received byte into the next location in the Trigger Block Reception Buffer. Next, at block 4045, the Trigger Byte Count (TBC) is decremented. If the TBC is not $\phi$ at block 4047, more characters are to be received in this Trigger block, and therefore, a Return from Interrupt (RET I) is executed at block 4049. If the TBC is equal to $\phi$ at block 4047, all of the characters for this Trigger block have been received and the routine next calculates the CRC on the received block at block 4051 and compares this to the CRC that was received in the block at block 4053. If no match is found at block 4055, the TE error exit routine is entered at block 4005. If the two CRC's catch at block 4055, then it is highly probable that the Trigger block has been received correctly. The routine next disables the Trigger character reception watchdog timer at block 4057 and passes on the block type field as received in the Trigger block. Based on the block type character, one of six routines is executed.

If the received block type field is found in block 4059 to equal $\phi$, the received block is a Trigger block. The Trigger block subroutine is entered at 4061 (FIG. 37A). The SCD electronics 514 keeps track of all trigger blocks received by keeping a log in memory. This allows the SCD to track its route within the retail store 107. It also allows interpolation between different trigger addresses to allow display of messages that have a direction sense (i.e., left or right). A display state machine uses the trigger log to modify the display of images. At block 4101 the last trigger log entry is examined. If the logged address equals the current trigger address at block 4103, then the exit time field of the last log entry is overwritten with the current time from the time-of-day clock at block 4105. If the log record indicates that a message based on this trigger address has been displayed as determined at block 4107, then the message is not displayed again and the TE exit subroutine is entered at 4005. If the last log entry does not match the current trigger address as determined at block 4103, then a new entry is created in the trigger log at block 4109. An example of the trigger reception log format is shown in FIG. 39, discussed further below. If the response to the test in block 4107 is negative or upon completion of the entry in the trigger log in block 4109, the program goes to block 4111. At block 4111, if the display state machine is currently executing (that is the state machine is not idle, which indicates that the program is in the process of displaying a message), then the TE exit subroutine is entered at block 4005. If the display state machine is found idle at block 4111, then at block 4113 message memory is searched for a message that matches the current trigger address. A test is made for a match at block 4115, and if no match is found, the TE exit subroutine is entered at block 4005. If a matching message is found, an additional test is made at block 4117 to determine whether or not the message update flag for this particular message is set. If so, it is not to be displayed, and the TE exit subroutine is entered at block 4005. If the message is not in the process of being updated, then the message address is saved for the foreground display task at block 4119. Next, a display request flag is set for the foreground display task at block 4121. Next, the displayed bit is set in the last trigger log entry at block 4123. Next, the status of the handle and motion sensors is logged in the current trigger log entry at block 4125. Finally, the TE exit subroutine is entered at block 4005.

The trigger exit (TE) subroutine, is shown in FIG. 37B. This is a normal and error exit routine that clears the trigger block reception buffer at block 4132, sets the trigger character reception state to idle (TCR=$\phi$) at block 4134, disables the trigger reception watchdog timer at block 4136, and reinitializes the trigger receiver circuits at block 4138. This is in anticipation of receiving the next valid trigger block. The routine finally does a Return From Interrupt (RET I) at block 4140.

If the received block type equals 1, as determined in block 4062, it is a poll (p2) request from the check-out transceiver 516. The PL subroutine is entered at block 4065 (FIG. 38A). At block 4201 a status response block is built in memory with a format as shown in FIG. 20. The subroutine then, at block 4203, calls the transmit response (TRESP) subroutine (FIG. 38D) and finally enters a TE error exit subroutine at block 4005.

If the received block type equals 2, as determined in block 4067, then a dump log (DL) request has been received. The DL subroutine is entered at block 4069 (FIG. 38B). At block 4205, a response block is built in memory from the data logs that have been accumulated. The format of the response is as shown in FIG. 21. The DL subroutine next, at block 4207, calls the transmit response (TRESP) subroutine and enters a TE exit subroutine at block 4005.

If the received block type equals 3 as determined in block 4071, then a clear log (CL) request has been received. The CL subroutine is entered at block 4073 (FIG. 38C). At block 4209, the memory resident logs are cleared. At block 4211, a response block is built in memory with a format according to FIG. 22. At block 4213 the transmit response (TRESP) routine is called. The CL subroutine finally enters a TE exit subroutine at block 4005.

If the received trigger block type equals 4, as determined in block 4075, then a Power Down Request (PDR) has been received. The PDR subroutine is entered at block 4077 (FIG. 38E). The subroutine branches to the power down routine (INACT) at block 2915 (FIG. 35A), where all interrupts are disabled at block 3910 before the warm boot flag is set in block 3911.

The transmit response (TRESP) subroutine (FIG. 38D) controls the response transmit circuitry. It is called by commands that are requested to return status and data to the check-out transceiver 516. Upon entry at block 4220, the subroutine disables the trigger receiver interrupts at block 4222. It then waits at block 4224 until the received carrier drops, which indicates end of the postamble of the received block. It then powers up the response transmitter circuitry at block 4226 and delays at block 4228 until the transmit circuitry is stable. It then transmits at block 4230 the response block that was built by the calling routine. It next powers down the response transmitter circuitry at block 4232 and delays at block 4234 until the transmitter circuitry is fully down. Next, at block 4236, it initializes the trigger receiver circuitry, and at block 4238, enables trigger receiver interrupts. Finally, the transmit response subroutine returns at block 4240 to the routine that called it.

A new log entry is created each time the SCD encounters a trigger transmitter the address of which is different than the previously logged trigger address. FIG. 39 shows an example of the format of a trigger reception log entry. The log contains characters identifying the log type 4300 and the address 4301 of the trigger transmitter that created the log. An entry time field 4303 identifies the time of day during which this log record was first created. An exit time field 4305 is updated continuously with the time of day, while a respective cart 500 is within the range of a respective trigger transmitter 512. If a message was displayed, the corresponding message number 4307 and version number 4309 is entered into the log. Additional bit flags are present in the log entry. They are:

Message Displayed 4311—this flag indicates that a message was displayed.
Status of Motion Detector 4313—this flag indicates whether or not the cart 500 was in motion during the message display.
Status of Handle Sensor 4315—this flag indicates if the cart handle was being held during the time of message display.
Trigger Transmitter Battery Status 4317—this flag is the status of the trigger transmitter battery as received in the trigger transmission block; this status is ultimately reported back to the in-store computer (ISC) 502 via the Polling Transceiver 516 and Local Area Network (LAN) 517 so that store personnel can replace the batteries in trigger transmitters before they fail. In the preferred embodiment, the format admits of future expansion at 4319.

While the invention has been described with reference to a particular embodiment, those of skill in the art will recognize modifications which nevertheless fall within the scope of the invention. For example, a message need not be limited to sight and sound, but also may include scent. Further, recipes may be printed out at the cart 500 by the printer 1327.

What is claimed is:

1. A system for determining the position of a shopping cart within a retail establishment comprising:
   means at a first location in said retail establishment for spontaneously transmitting a position signal;
   means associated with said shopping cart for receiving said position signal;
   means for generating positional data from said position signal, wherein said positional data are representative of the position of said shopping cart within said retail establishment;
   means for storing said positional data; and
   means for analyzing said stored positional data to determine the path taken by said shopping cart within said retail establishment.

2. A system for determining the position of a shopping cart within a retail establishment comprising:
   a plurality of transmitting means each disposed in a different predetermined location in said retail establishment and each for spontaneously transmitting a position signal;
   means associated with said shopping cart for receiving a plurality of said position signals from a plurality of said transmitting means;
   means for generating positional data from each received position signal wherein each said positional data is representative of the position of said shopping cart within said retail establishment when one of said position signals is received; and
   means for contemporaneously storing said positional data representing a plurality of positions of said shopping cart.

3. The system of claim 2 further comprising means for analyzing said stored positional data representing said plurality of positions of said shopping cart to determine the path taken by said shopping cart within said retail establishment.

4. A system for determining the position of a shopping cart within a retail establishment comprising:
   means at a first location in said retail establishment for spontaneously transmitting a position signal;
   clock means for generating signals representative of the passage of time;
   means associated with said shopping cart for receiving said position signal;
   means responsive to said clock means for generating positional data from said position signal, wherein said positional data are representative of the position of said shopping cart within said retail establishment and the time at which said positional data are generated; and
   means for storing said positional data.

5. The system of claim 4 comprising means for analyzing said positional data.

6. The system of claim 4 comprising means for analyzing said positional data to determine the manner in which the retail establishment is traversed.

* * * * *